US011711392B2

(12) United States Patent
Ree et al.

(10) Patent No.: US 11,711,392 B2
(45) Date of Patent: *Jul. 25, 2023

(54) SYSTEM FOR ATTACK PROTECTION IN IOT DEVICES

(71) Applicant: ioXt, LLC, Newport Beach, CA (US)

(72) Inventors: Brad Ree, Newport Beach, CA (US); Craig Trivelpiece, Lake Forest, CA (US)

(73) Assignee: ioXt, LLC, Newport Beach, CA (US)

(*) Notice: Subject to any disclaimer, the term of this patent is extended or adjusted under 35 U.S.C. 154(b) by 312 days.

This patent is subject to a terminal disclaimer.

(21) Appl. No.: 16/944,822

(22) Filed: Jul. 31, 2020

(65) Prior Publication Data

US 2021/0037049 A1 Feb. 4, 2021

Related U.S. Application Data

(60) Provisional application No. 62/881,870, filed on Aug. 1, 2019, provisional application No. 62/881,218, filed on Jul. 31, 2019.

(51) Int. Cl.
| | |
|---|---|
| *H04L 9/40* | (2022.01) |
| *G06F 1/28* | (2006.01) |
| *G06N 20/00* | (2019.01) |
| *G16Y 30/10* | (2020.01) |
| *H04L 43/16* | (2022.01) |

(Continued)

(52) U.S. Cl.
CPC ............ *H04L 63/1433* (2013.01); *G06F 1/28* (2013.01); *G06N 20/00* (2019.01); *G06V 40/50* (2022.01); *G16Y 20/30* (2020.01); *G16Y 20/40* (2020.01); *G16Y 30/10* (2020.01); *H04L 43/16* (2013.01); *H04L 63/1416* (2013.01); *H04L 63/1425* (2013.01); *H04L 63/1458* (2013.01); *H04L 63/20* (2013.01); *H04L 2101/622* (2022.05)

(58) Field of Classification Search
CPC . H04L 63/1433; H04L 43/16; H04L 63/1416; H04L 63/1425; H04L 63/1458; H04L 63/20; G06N 20/00; G16Y 30/10; G16Y 20/40; G16Y 20/30; G06V 40/50; G06F 1/28
See application file for complete search history.

(56) References Cited

U.S. PATENT DOCUMENTS

| | | | |
|---|---|---|---|
| 2016/0149777 A1* | 5/2016 | Kim | ............ H04L 67/12 709/224 |
| 2018/0144139 A1* | 5/2018 | Cheng | .......... H04L 63/1425 |
| 2021/0250117 A1* | 8/2021 | Homchaudhuri | ...... H04L 1/08 |

* cited by examiner

*Primary Examiner* — Oleg Korsak
(74) *Attorney, Agent, or Firm* — Jordan A. Sigale; Vedder Price P.C.

(57) ABSTRACT

An Internet of Things device is herein disclosed. The Internet of Things device comprises a communications module having circuitry to communicatively connect to a computer network, a memory operable to store data, a processor coupled to the memory and the communications module and operable to execute instructions stored in the memory, and an activity module, including at least one of a sensor and a control device. The activity module operates under control of the processor to perform a designated activity with at least one of the sensor and the control device. The activity module further communicates on the computer network via the communications module. The processor curtails a volume of communication of the communications module on the computer network if a measured value of a system parameter exceeds a threshold value.

21 Claims, 5 Drawing Sheets

(51) Int. Cl.
*G16Y 20/40* (2020.01)
*G16Y 20/30* (2020.01)
*G06V 40/50* (2022.01)
H04L 101/622 (2022.01)

SYSTEM FOR ATTACK PROTECTION IN IOT DEVICES

INCORPORATION BY REFERENCE

The present patent application claims priority to Provisional Patent Application U.S. Ser. No. 62/881,218 titled "System and Method for BOT Attack Protection In IOT Devices", filed on Jul. 31, 2019, and Provisional Patent Application U.S. Ser. No. 62/881,870 entitled "SYSTEM AND METHOD FOR STOPPING BOTNET ATTACKS AT THE SOURCE", filed on Aug. 1, 2019, the entire contents of both applications are hereby expressly incorporated herein by reference.

BACKGROUND OF THE INVENTION

Field of the Invention

The present disclosure relates generally to network connected devices and, more particularly, to a system and method to prevent attacks against such devices.

Description of the Related Art

In recent times, a large array of devices have been connected to a network, such as the Internet. Often referred to as the Internet of Things (IoT), this array includes sensors, such as temperature sensors, pressure sensors, moisture sensors, light sensors, motion sensors, and the like. These sensors are Internet connected and remotely accessed. For example, a temperature sensor could monitor the temperature of a home, a refrigerator, or a freezer. The temperature can be remotely reported to a user's device, such as a mobile communication device (e.g., cellphone). Similarly, moisture sensors can report water leaks from a washing machine or water heater. Motion sensors can be used as part of a security system.

Other IoT devices are active devices, such as remote-controlled video monitors, temperature controllers, and the like. Active IoT devices in automobiles permit the user to remotely start the car and warm up the engine or adjust the interior temperature. The common feature with all the IoT devices is the ability to communicate using the Internet. This common feature is also a potential shortcoming for IoT devices. The lack of security in IoT devices often leaves them vulnerable to attack by unscrupulous individuals.

Major Internet outages have been caused by hacking connected IoT devices and have them simultaneously direct Internet traffic at specific websites or Internet infrastructure. These are commonly referred to as "IoT Robot (BOT) Attacks." Other types of IoT attack, such as distributed denial of service (DDoS) attacks, remotely cause flooding of traffic on wired and wireless communication systems to effectively shut them down or cripple their performance. Some attacks have been merely to cause excessive power drain so that batteries designed to last for years are reduced to months or weeks. In some cases, device software bugs or other failures have caused similar types of excessive communications traffic. An IoT device that has been hacked, is thought to have been hacked, is part of a BOT attack, or experiences a software bug or other failure may be considered compromised or infected.

Most of the defenses to these attacks have been reactive instead of proactive. Reactive responses try to mitigate or control the damage, but are not really a solution. As billions more IoT devices are deployed in the world the problem will only get worse.

What is needed is a solution that detects and stops these attacks at the source, namely the IoT devices. This present disclosure describes methods to detect and minimize or stop the attacks even if the IoT device's software has been completely compromised.

SUMMARY OF THE INVENTION

An Internet of Things device is herein disclosed. The problem of detecting and minimizing or stopping the attacks even if the IoT device's software has been completely compromised is addressed by the Internet of Things device comprising a communications module having circuitry to communicatively connect to a computer network, a non-transitory memory operable to store data, a processor coupled to the memory and the communications module and operable to execute instructions stored in the memory, and an activity module, including at least one of a sensor and a control device. The activity module operates under control of the processor to perform a designated activity with at least one of the sensor and the control device. The activity module further communicates on the computer network via the communications module. The processor curtails a volume of communication of the communications module on the computer network if a measured value of a system parameter exceeds a threshold value.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF THE INVENTION

Figure 1A:
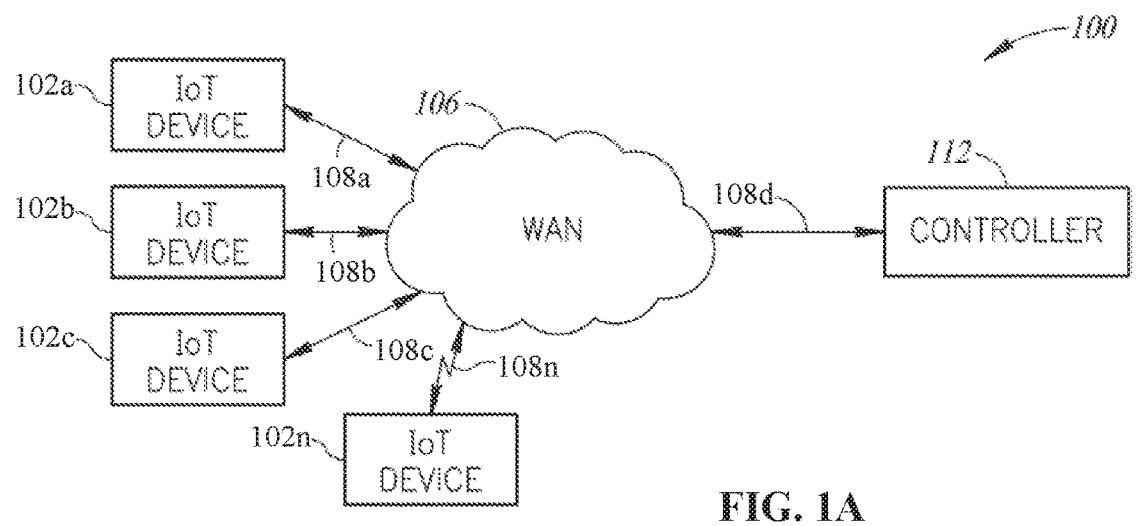
FIG. 1A is diagram of a system architecture implemented in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted. The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

"Circuitry", or "electrical circuitry" as used herein, may be analog and/or digital components, or one or more suitably programmed processors (e.g., microprocessors) and associated hardware and software, or hardwired logic. Also, a "component" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like.

As used herein, an attack may include simultaneously directing Internet traffic to a target device, such as an IoT device, a specific website server or specific Internet infrastructure. Attacks may further include BOT Attacks, DDoS attacks, and target device hardware attacks, such as battery attacks, e.g., an attack to cause excessive power drain of the target device, or other attacks of the target device intending to affect usage of the target device's hardware in a manner inconsistent with the target device's intended use.

The present disclosure may be implemented, in one embodiment, in a system 100 illustrated in FIG. 1A. The system 100 includes a plurality of IoT devices 102$a$-$n$ coupled to a wide area network (WAN) 106, such as the Internet, via respective communication links 108$a$-$n$. The system 100 also includes a controller 112 coupled to the WAN 106 via a communication link 108$d$. The IoT devices 102$a$-$n$ may be any IoT device 102, such as those previously described. However, the system 100 is not limited to any particular type of IoT device 102$a$-$n$. The communication links 108$a$-$n$ are intended to generically illustrate any form of communication link for passing network traffic.

Figure 1B:
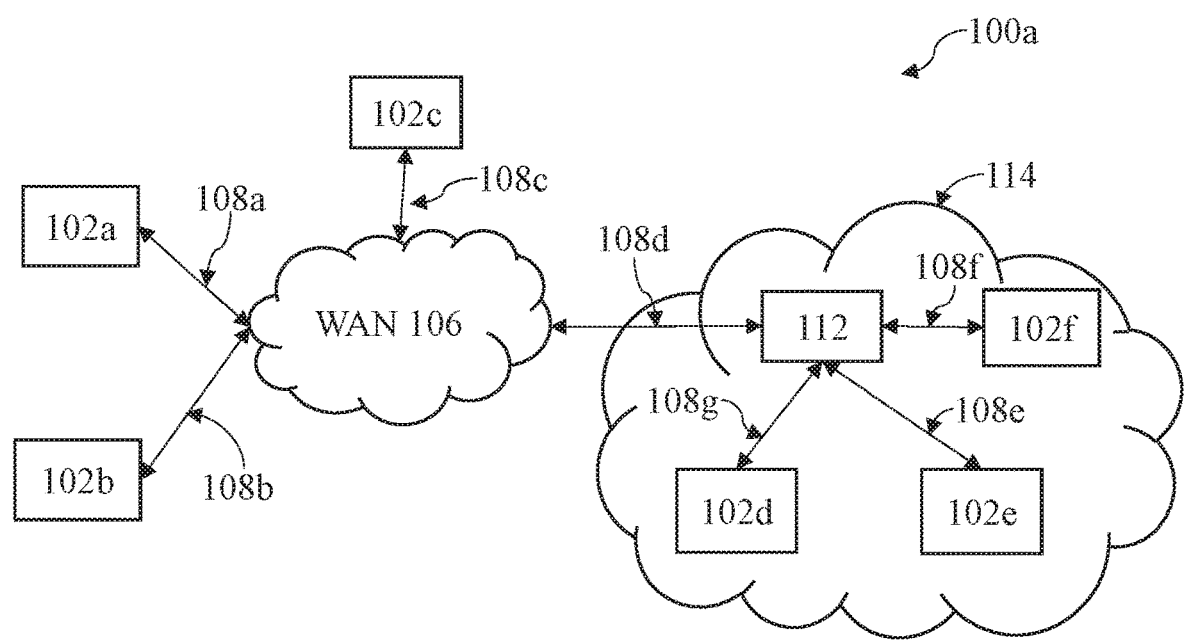
FIG. 1B is a diagram of another embodiment of a system architecture implemented in accordance with the present disclosure.

Shown in FIG. 1B is a system 100$a$ that is similar in construction and function as the system 100 with the exception that the controller 112, and at least some of the IoT devices 102$d$-$f$ communicate via a local area network 114, that may be interfaced with the WAN 106 via the communication link 108$d$. The local area network 114, for example, may be a home network or a business network. In this embodiment, at least some of the IoT devices 102$d$-$f$ communicate with the WAN 106 via the local area network 114 or through a network service provider. In other examples, at least some of the IoT devices 102$a$-$n$ communicate directly with the WAN 106, such as by the use of cellular wireless communication systems.

Network traffic may include one or more network packet, also referred to as a data packet, sent from a sending device (e.g., one of the IoT devices 102$a$-$n$) and received by a receiving device (e.g., another one of the IoT devices 102$a$-$n$ or device being attacked) during an active network connection. The active network connection may be formed by one or more communication link 108$a$-$n$ and/or the WAN 106 between the sending device and the receiving device. A communication stream may include network traffic from the sending device to the receiving device. Each network packet may include header information and data. The communication link 108 associated with each IoT device 102 enables any one of the IoT device 102 to transmit data as a communication stream from the IoT device 102 to the controller 112 or another IoT device 102 via the WAN 106.

It is also possible to connect devices wirelessly. For instance, FIG. 1A illustrates the IoT device 102$b$ coupled to the WAN 106 via the communication link 108$b$. The communication 108$b$ can be a wireless communication link. Again, those skilled in the art will appreciate that the communication link 108*b* may be a Wi-Fi communication link with a wireless access point (not shown). Alternatively, the communication link 108*b* may be a Bluetooth communication link and/or the like. In yet another embodiment, the communication link 108*b* may be a cellular communication link. In FIG. 1A, wireless antenna 168 (shown in FIG. 3 below) (e.g., cell phone infrastructure, cell towers, base stations, and the like) is omitted for the sake of clarity. However, those skilled in the art will appreciate that the communication link 108*b* may be implemented using any of a number of different known communication technologies.

In one embodiment, the communication links 108*a-n* depict a pathway for bidirectional communication between one or more IoT device 102*a-n*, the controller 112, and/or another IoT device 102*a-n* connected to a computer network such as the WAN 106 or the local area network 114. In one embodiment, the WAN 106 may be almost any type of computer network and may be implemented by using one or more network topology and/or protocol, such as the World Wide Web (or Internet using a TCP/IP protocol), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, a short-range wireless network (such as a Zigbee network, an IEEE 802.15.4/802.15.5 network, and/or the like), a wireless mesh network, a P2P network, an LPWAN network, a Z-wave network, and combinations thereof, and/or the like. It is conceivable that in the near future, embodiments of the present disclosure may use more advanced networking topologies and/or protocols. Each communication link 108*a-n* may be implemented based, at least in part, on one or more protocol of the one or more network topology used to implement the WAN 106 and/or the LAN 114. Thus, the one or more communication link 108*a-n* is not dependent on a particular selection of protocol and/or network hardware or network topology used to implement each communication link 108.

In the embodiment of FIG. 1A, each IoT device 102*a-n* communicates with the controller 112 via the communication link 108 and the WAN 106. The controller 112 may be implemented as part of a personal computer, a laptop, a server, a mobile communication device (e.g., cell phone, PDA), a stand-alone device, or the like or some combination thereof. For the sake of simplicity, these various embodiments are illustrated generically in FIG. 1A as the controller 112.

The controller 112 communicates with the WAN 106 via the communication link 108*d*. The communication link 108*d* may be implemented as described above. For example, if the controller 112 is a PC, the communication link 108*d* may be a conventional network connection, such an Ethernet connection to a network service provider. The communication link 108*d* may also be a wireless communication link. In yet another embodiment, if the controller 112 is implemented in a mobile communication device, the communication link 108*d* may be a cellular communication link.

The controller 112 may be a stand-alone controller that connects to and communicates on the LAN 114. In this embodiment, the controller 112 communicates with at least one IoT device 102*d-f* via communication links 108*g-i* implemented as local LAN connections. The controller 112 does not need to connect to all of the plurality of IoT devices 102*a-n* via the internet or another external network. In these various possible implementations, conventional infrastructure, such as wired and wireless connections to Internet service providers, routers, modems, gateways, cellular infrastructure, and the like are omitted for the sake of clarity.

The IoT device 102 is implemented as a combination of hardware and software. The software is vulnerable to remote hacking that allows the hacker to control all aspects of the IoT device 102 and mount the attacks of the sort described above. Unintentional software bugs can cause malfunctions that can resemble these attacks. To detect and prevent the attacks, the hardware in the IoT device 102 detects and stops attacks, preferably outside of the control of the software. Examples of attack models are described in the priority Provisional Patent Application U.S. Ser. No. 62/881,218 using the term "profile".

Communication channels, that is, use of a transceiver 132 and/or a communications module 130 as described below in more detail, of IoT devices 102*a-n* are often the largest consumers of power in the IoT device 102. When transmitting, power consumption of the IoT device 102 is at its highest level and often control lines turn on or off the transceiver 132 or other components such as radio modules or Ethernet subsystems as shown in FIG. 2 and described in more detail below.

The system 100 provides a system and method to detect a measured value of a system parameter, e.g., power consumption, and determine if the measured value is higher than normal. This can be caused by a number and/or duration of transmissions exceeding a normal level of a number and/or duration of transmissions. If the measured value of the system parameter is higher than normal or a threshold, the system and method may throttle the transmissions down or turn the transmissions off to stop or vastly limit IoT attacks, such as BOT attacks and DDoS attacks. In addition, the control mechanisms described herein make this detection and throttling either in hardware or a place that is outside of the control of compromised software. This assures proper detection and throttling of attacks even if the software has been modified by the hacker. The methods of detection may be direct, such as within the communication modules, or inferred, such as measuring power consumption changes or transmission time.

Figure 2A:
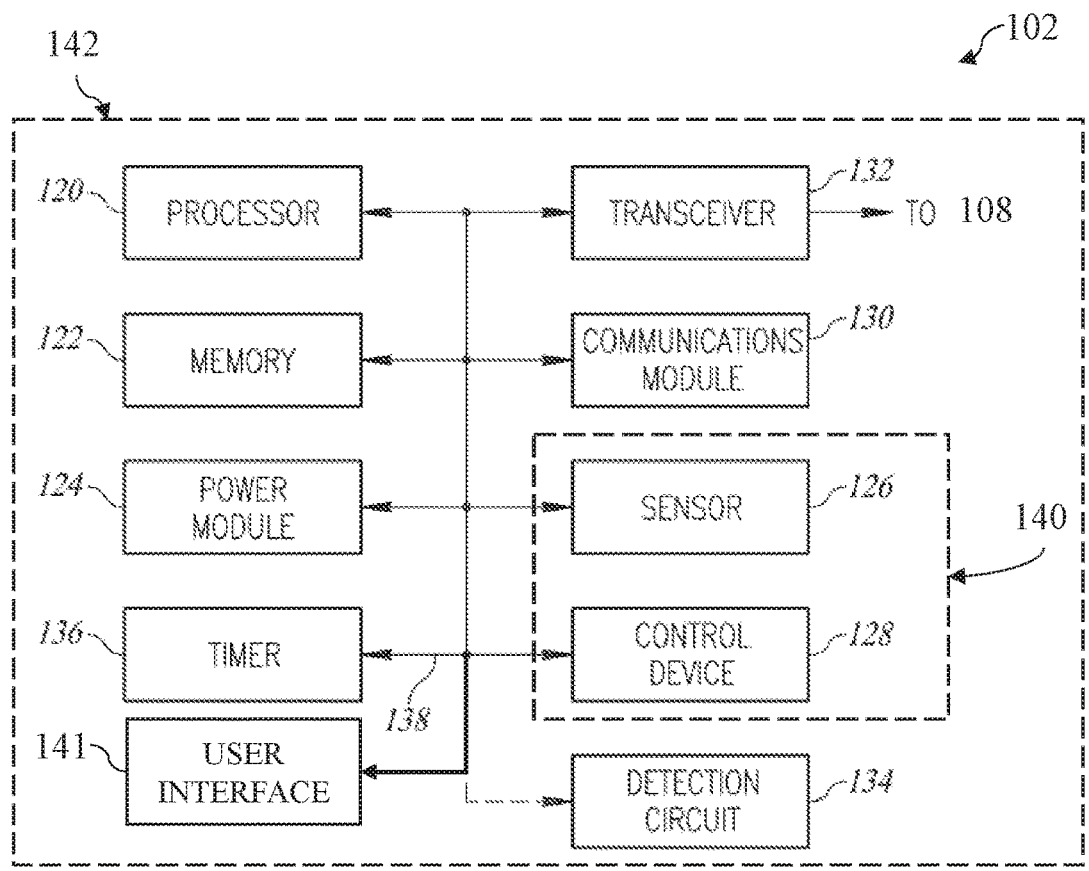
FIG. 2A is a functional block diagram of an IoT device constructed in accordance with the present disclosure.

FIG. 2A illustrates a functional block diagram of an exemplary embodiment of the IoT device 102 constructed in accordance with the present disclosure. Generally, the IoT device 102 includes a plurality of components such as a processor 120, a memory 122, a power module 124, a sensor 126, a control device 128, a communications module 130, a transceiver 132, a detection circuit 134, and/or a timer 136, each component being connected to another component via a bus system 138. The sensor 126 and the control device 128 are components of an activity module 140 as discussed below. The IoT device 102 also includes a housing 142 surrounding and containing the processor 120, the memory 122, the sensor 126, the control device 128, the communications module 130, the transceiver 132, the detection circuit 134, and the timer 136. Depending upon the form of the power module 124, the housing 142 may or may not surround and contain the power module 124. In some embodiments discussed below, the power module 124 may be external to the housing 142. Those skilled in the art will appreciate that the processor 120 may be implemented as a conventional micro-processor, application specific integrated circuit (ASIC), digital signal processor (DSP), programmable gate array (PGA), or the like. Alternatively, the processor 120 may be replaced by individual electrical circuit components depending on the complexity of the IoT device 102a. The IoT device 102 is not limited by the specific form of the processor 120. Additionally, the processor 120 may refer to a single processor 120 or multiple processors 120 working independently or together to collectively perform a task. In one embodiment, one or more of the plurality of components of the IoT device 102 may be implemented as a circuit on or within a particular chip such as a System On a Chip (SoC).

The IoT device 102 in FIG. 2A also contains the memory 122. In general, the memory 122 may be one or more non-transitory computer readable medium that stores computer executable instructions and data to control the operation of the processor 120 and/or other components. The memory 122 may include random access memory, read-only memory, programmable memory, flash memory, and the like. The IoT device 102 is not limited by any specific form of hardware used to implement the memory 122. The memory 122 may also be integrally formed in whole or in part with the processor 120.

Figure 2B:
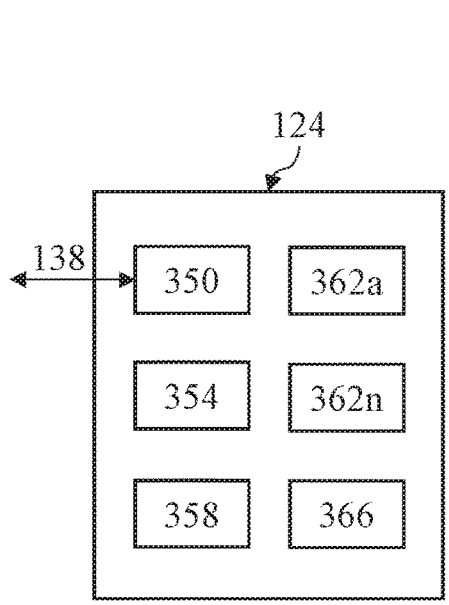
FIG. 2B is a functional block diagram of an exemplary embodiment of a detection circuit constructed in accordance with the present disclosure.

The IoT device 102 also includes the power module 124. Referring now to FIG. 2B, shown therein is a block diagram of an exemplary embodiment of the power module 124 constructed in accordance with the present disclosure. In one embodiment, the power module 124 is positioned within the housing 142 and includes a processor 350, a memory 354, a power supply 358, one or more control switch 362a-n, and regulating circuitry 366. The processor 350 may be constructed in a manner similar to the processor 120. The memory 354 may be constructed in a manner similar to the memory 122.

The details of the implementation of the power module 124 depend on the specific design of the IoT device 102. For example, the power supply 358 may be a battery or a battery with voltage and/or current regulating circuitry 366. In another embodiment, the power supply 358 may be a port configured to receive a power from an external source, such as, from an electrical receptacle. In that embodiment, the power supply 358 may also include an AC plug configured to supply power from the electrical receptable and may also include a modular power supply, such as commonly used with cellular telephones. The power supply 358 in this embodiment includes a voltage transformer as well as voltage and/or current regulator circuitry that may be external to the housing 142. In either embodiment, the power module 124 has circuitry to supply power to the processor 120, the memory 122, the sensor 126, the control device 128, the communications module 130, the transceiver 132, and the detection circuit 134. Where the power is supplied from a source external from the housing 142 of the IoT device 102, the power module 124 may be referred to as an external power module. Similarly, a power module 124 having circuitry to supply power from a source (e.g., battery) internal to the housing 142 of the IoT device 102a may be referred to as an internal power module.

In one embodiment, the power module 124 includes one or more control switch 362a-n connected to a power bus. Each of the one or more control switch 362a-n may be logically connected to the processor 350 thereby enabling the processor 350 to cause one or more of the control switch 362a-n to enable or disable a power connection of a power bus between the power module 124 and other components of the IoT device 102. In this way, the processor 350 of the power module 124 may enable a particular component of the IoT device 102 or disable a particular component of the IoT device 102 by enabling or disabling the power connection between the particular component. In one embodiment, each of the one or more control switch 362a-n may be connected to a control bus, thereby enabling another component of the IoT device 102 to enable or disable the power connection of the power bus.

In one embodiment, the one or more control switch 362a-n includes a power monitor (e.g., ammeter and/or voltmeter) to measure a current, and/or a voltage supplied by the power module 124 to each component of the IoT device 102. Signals indicative of the current and/or voltage may be supplied to the processor 350, which may compute an amount of power supplied by the power module to each component of the IoT device 102, or an aggregate power supplied by the power module to two or more components of the IoT device 102. In one embodiment, the processor 350 may determine the power supplied by the power module 124 by measuring the power monitor of each control switch 362 and storing each power supplied in the memory 354. In one embodiment, the processor 350 is connected to the data bus 138. In such an embodiment, the processor 350 may send one or more power data to another component of the IoT device 102. The power data may include a voltage supplied, a current supplied, and a duration for supplying the voltage and current, or some combination thereof. As discussed below, when the abnormal parameter value, such as enhanced power usage is detected, the processor 350 may send a disable signal to one or more of the control switches 362a-n to disable one or more components of the IoT device 102 as discussed below. It should be noted that the enhanced power usage may be below a power level set to protect one or more components of the IoT device 102 from damage. In other words, the enhanced power usage may be below an amount of power required to activate a fuse protecting components of the IoT device 102.

In one embodiment, the regulating circuitry 366 may regulate a power or voltage supplied by the power source 358 to normalize the power or voltage such that the components of the IoT device 102 may be supplied with adequate power to enable each component to function. In one embodiment, the regulating circuitry 366 may include one or more sensor. For example, if the sensor is temperature probe, the temperature probe may measure a temperature of the processor 350, the memory 354, the power supply 358, the one or more control switch 362a-n, and the regulating circuitry 366, or some combination thereof. In one embodiment, the processor 350 may read the temperature of the processor 350, the memory 354, the power supply 358, the one or more control switch 362a-n, or the regulating circuitry 366 and record the temperature in the memory 354. The processor 350 may send one or more power module data to another component of the IoT device 102. The power module data may include a temperature for one or more of the processor 350, the memory 354, the power supply 358, the one or more control switch 362a-n, and the regulating circuitry 366. If the power and/or temperature exceeds a threshold, the processor 350 may send a signal to one or more of the control switches 362a-n to remove power from one or more components of the IoT device 102 to disable the IoT device 102.

Referring back to FIG. 2A, the IoT device 102 generically represents many different forms of the one or more IoT devices 102a-n. The IoT device 102 may optionally have the sensor 126 and/or the control device 128. For example, the sensor 126 may include, by way of example, a temperature sensor, a pressure sensor, a moisture sensor, a light sensor, a motion sensor, and/or the like. The sensor 126 is not limited to these examples. Similarly, the control device 128 may be, by way of example, a remote-controlled video camera, a temperature controller, and the like. Again, the control device 128 is not limited to these examples. One or more IoT device 102*a-n* may include both the sensor 126 and the control device 128. In one embodiment, the IoT device 102 may include one or more sensor 126 and/or one or more control device 128.

In one embodiment, the sensor 126 and the control device 128 may be referred to, collectively, as the activity module 140. The IoT device 102*a-n* may include one or more activity module 140, each activity module 140 including one or more sensor 126 and one or more control device 128. The activity module 140 may be operable to perform a designated activity with the sensor 126 and the control device 128. The activity module 140 may further be operable to operate the communications module 130, e.g., cause the communications module 130 to transmit via a network, e.g., via a computer network or the WAN 106, one or more communication to the controller 112. The activity module 140 is said to be active when the control device 128 operates the communications module 130 and is said to be inactive when the control device 128 does not operate the communications module 130. Each activity module 140 may include an activity model. In one embodiment, the activity model includes an inactive activity power based at least in part on a power used by the activity module 140 while the activity module 140 is inactive and an active activity power based at least in part on a power used by the activity module 140 while the activity module 140 is active and is performing the designated activity.

In another embodiment, the activity model includes an inactive activity transmission time based at least in part on a length of time during which the activity module 140 is operating the communications module 130 while inactive and an active activity transmission time based at least in part on a length of time during which the activity module 140 is active and is performing the designated activity. In yet another embodiment, the activity model includes an inactive time based in part on a period of time in which the activity module 140 is inactive and an active time based in part on a period of time in which the activity module 140 is active. In one embodiment, the activity model includes one or more of the inactive activity power, the active activity power, the inactive activity transmission time, the active activity transmission time, the inactive time, and the active time, or some combination thereof.

The IoT device 102*a-n* also includes the communications module 130. The communications module 130 may be a logical layer operated by the processor 120 that is used to control the transceiver 132 for transmitting and/or receiving information from the WAN 106 or the local area network 114. As previously noted, the IoT device 102 is typically connected to the WAN 106, which may typically be the Internet. The communications module 130 provides the connectivity between the IoT device 102*a-n* and the controller 112 (see FIG. 1A). The communications module 130 typically provides two-way communication with the controller 112 via the transceiver 132. For example, the communications module 130 may communicate with the sensor 126 to provide continuous sensor readings (e.g., temperature) or may provide sensor readings upon command from the controller 112. Similarly, the communications module 130 may communicate with the control device 128, such as a video camera, to provide video data to the controller 112 via the communications module 130 and transceiver 132. The control device 128 may be controlled remotely by the controller 112 via the transceiver 132 and the communications module 130 to change the focus or to change the viewing direction.

In some implementations, the transceiver 132 may have a wired connection to the WAN 106 or local area network 114 and communicate via, by way of example, a network service provider or internet service provider (not shown) using an Ethernet connection connected to a hard-wired network access point. In other implementations, the transceiver 132 may have a wireless connection to the WAN 106. In this implementation, the transceiver 132 of the IoT device 102 may include a power amplifier 154.

The transceiver 132 illustrated in FIG. 2A includes a transmitter and a receiver and is intended to encompass both a short range, (e.g., WiFi connection), a cellular connection, or other wireless connection to the WAN 106. In other embodiments, the transceiver 132 may include a receiver and/or transmitter operable to communicate over a wired connection. In one embodiment, the transceiver 132 and the communications module 130 may be integrated.

Figure 2C:
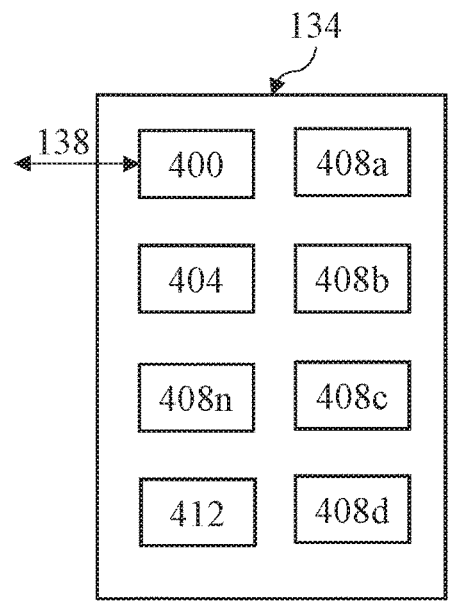
FIG. 2C is a functional block diagram of an exemplary embodiment of a power module constructed in accordance with the present disclosure.

Referring now to FIG. 2C, shown therein is a block diagram of an exemplary embodiment of the detection circuit 134. Generally, the detection circuit 134 is positioned within the housing 142 and may include a processor 400, a memory 404, and one or more detectors 408*a-n*. The processor 400 may be constructed similar to the processor 122 and is connected to a data bus and/or control bus of the bus system 138. The memory 404 may be similar to the memory 122 discussed above. The memory 404 may not be connected to the system bus 138 to maintain isolation between the detection circuit 134 and the software stored in the memory 122 and being executed by the processor 120 so as to reduce the likelihood that the memory 404 and the processor 400 can be hacked.

In one embodiment, the one or more detector 408*a-n* includes sensors configured to determine various parameters of the IoT device 102, for example, a temperature sensor 408*a* to determine a temperature of one or more associated component of the IoT device 102, a power sensor 408*b* to determine a power consumption of one or more component of the IoT device 102, a photodetector 408*c* configured to determine a light produced by one or more component of the IoT device 102, and a bus monitor 408*d* configured to determine use of one or more bus or control line of the system bus 138. The one or more detector 408*a-n* is not limited to the above examples and may be any other detector designed or configured to determine a parameter of the IoT device 102. In one embodiment, the one or more detector 408*a-n* may include a radio wave sensor configured to determine whether or not the transceiver 132 is transmitting or receiving.

Each of the one or more detector 408*a-n* may be logically connected to the processor 400 thereby enabling the processor 400 to measure the parameter determined by each detector 408*a-n*. In one embodiment, the processor 400 may measure each parameter determined by each detector 408*a-n* and store each parameter in the memory 404.

In one embodiment, the processor 400 is connected to the bus system 138. In such an embodiment, the processor 400 may receive one or more data from each component of the IoT device 102, for example but not limited to the power data from the power module 124. The processor 400 may also be logically connected to the bus system 138, and more specifically to the control bus, thereby enabling the processor 400 to send one or more control signal to each component of the IoT device 102. In one embodiment, the one or more control signal may include a deactivate command or a power-off command. In another embodiment, the one or more control signal is sent to the power module 124 causing the power module 124 to disable power to a particular one or more component of the IoT device 102.

In one embodiment, the detection circuit 134 includes a power source 412. The power source 412 may be connected directly to the power module 124, thus providing a power to the detection circuit 134 without using the power bus of the system bus 138. In one embodiment, the power source 412 is independent from the power module 124, e.g., a dedicated battery.

As those skilled in the art will appreciate, the goal of a BOT attack is the takeover of operation of the IoT device 102*a-n*. Typically, the takeover of the IoT device 102*a-n* results in uncontrolled data transmissions resulting in a large volume of data transmitted to the WAN 106 (see FIG. 1A) or the local area network 114. Such uncontrolled data transmissions require that the communications module 130 and/or transceiver 132 are active. The detection circuit 134 in FIG. 2A is used to indirectly determine the activity level of the communications module 130 and/or the transceiver 132 as discussed in more detail below. The detection circuit 134 can measure a system parameter, such as an operating parameter, a selected operational parameter, or a monitored parameter, that will provide information regarding the activity of the communications module 130 and/or transceiver 132. The measurement of the system parameter may result in a measured value of the system parameter.

FIG. 2A also illustrates the timer 136. As will be described in greater detail below, some attack detection techniques may measure one or more system parameter over a period of time, as measured by the timer 136. For example, one form of attack transmits data for an excessive length of time. The timer 136 can determine how long the transceiver 132 is active. If the transceiver 132 is active for a time period measured by the timer 136 that exceeds a threshold time period, the detection circuit 134 may generate a signal to indicate the detection of an attack. The timer 136 may be integrally formed with the processor 120 or may comprise a set of computer instruction processed by the processor 120 to measure a particular time period. In another embodiment, the timer 136 may be circuitry separate from, but in communication with, the processor 120. Each of the one or more components of the IoT device 102*a-n* measuring time of an activity being performed may be in communication with the timer 136.

The various components of the IoT device 102*a-n* are coupled together by the bus system 138. The bus system 138 may include an address bus, data bus, control bus, power bus, and/or the like. For the sake of convenience, the various busses are illustrated in FIG. 2A as the bus system 138. The detection circuit 134 is illustrated in FIG. 2A as coupled to the bus system 138 by a dashed line. This is intended to indicate that the detection circuit 134 may be integrated with the processor 120, the memory 122, the power module 124, the sensor 126, the control device 128, the communications module 130 and/or the transceiver 132. Or, the detection circuit 134 may be separate from the processor 120, the memory 122, the power module 124, the sensor 126, the control device 128, the communications module 130 and/or the transceiver 132 and not connected via the bus system 138.

As noted above, the detection circuit 134 may indirectly determine the activity level of the communications module 130 and/or the transceiver 132. A direct measure technique of data transmission is defined herein as a technique that is in a communications pathway and plays a direct, active role in the operation of the communications pathway. In this embodiment, the communications pathway may be a bus of the bus system 138 operable to enable data communications (e.g., along the data bus) or other control activities (e.g., along the control bus) between the plurality of components of the IoT device 102. Typically implemented as a series of computer instructions, communications driver software, monitor software, and the like, are examples of direct monitoring of the level of communication activity. In one embodiment, one or more direct measure technique may include, for example, one or more of measuring the number of data bytes transmitted to the WAN 106, monitoring the intended destination of the data transmissions, and, in some cases, may even examine the actual data in the transmitted data bytes.

In contrast, an indirect technique, as used herein, is not part of the communications pathway and is not involved in any control of the communications pathway itself. For example, it is known that the communications module 130 and transceiver 132 consume large amounts of power when active. In one embodiment, by monitoring the level of power utilization with the power sensor 408*b*, the processor 400 of the detection circuit 134 can infer when the IoT device 102*a-n* is transmitting data. Similarly, by monitoring the level of power utilization with the power monitor of the one or more control switch 362*a-n*, the processor 350 can infer when the IoT device 102*a-n* is transmitting data. In another embodiment, the communications module 130 or transceiver 132. may be connected to the control bus of the bus system 138. One or more control signal sent on the control bus to the communications module 130 and/or the transceiver 132 may cause the communications module 130 or the transceiver 132 to activate. The processor 400 of the detection circuit 134 can determine by measuring the bus monitor 408*d* configured to monitor the control bus, that the transceiver 132 of the IoT device 102*a-n* is actively transmitting data. In yet another embodiment, the IoT device 102*a-n* may have an indicator, such as a light emitting diode (LED) (not shown), that is activated when the communications module 130 or transceiver 132 are transmitting data. The photodetector 408*c* of the detection circuit 134 may be positioned within the housing 142 to receive light from the LED indicative of the received light over time to determine a level of activity of the communication module 130 or transceiver 132. In each of these examples, the detection circuit 134 is not part of the communications pathway and only indirectly determines a level of activity of the communications module 130 and/or transceiver 132.

Figure 3:
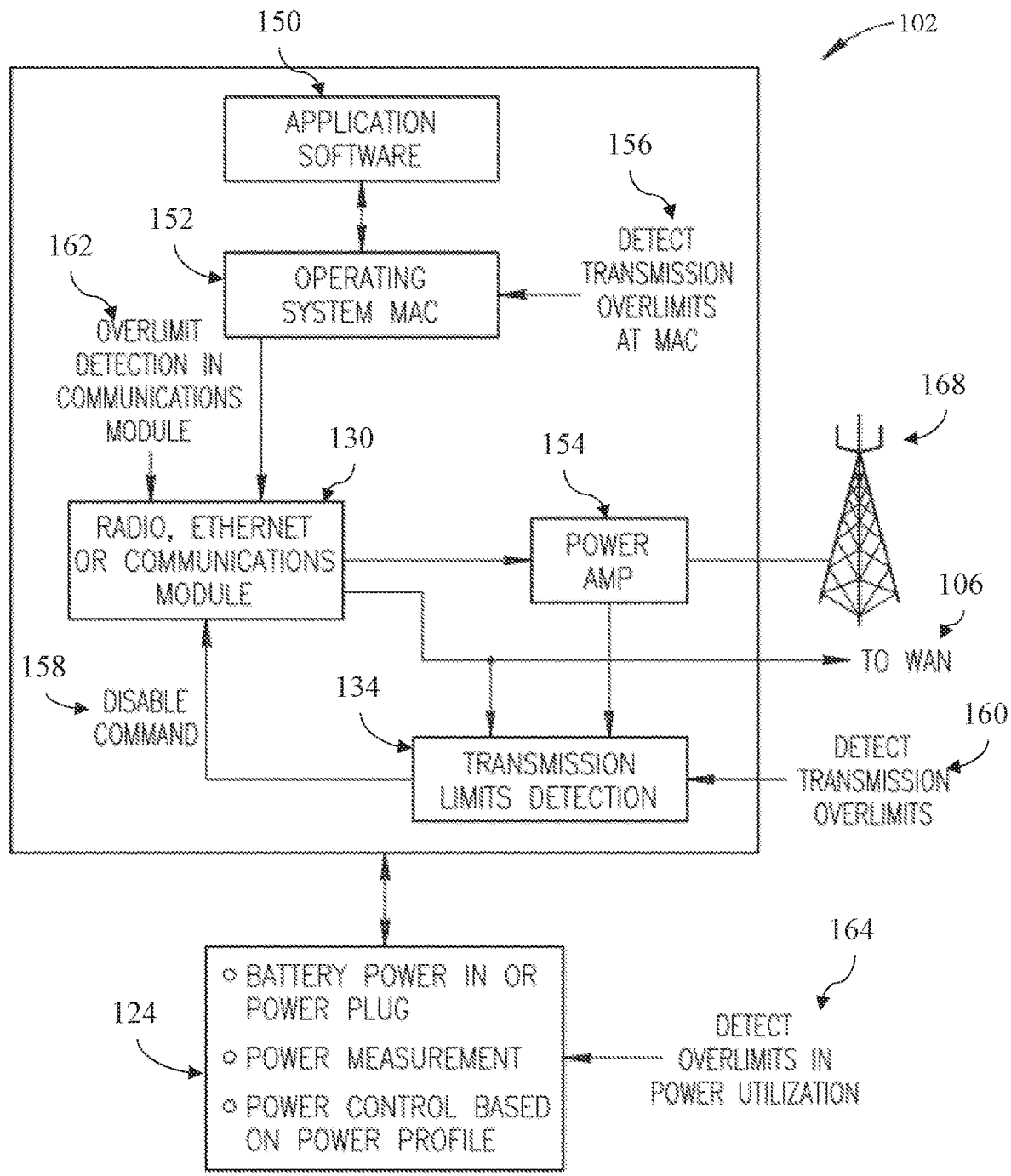
FIG. 3 illustrates a block diagram of a typical IoT connected device and various parameter measurement points.

Referring now to FIG. 3, shown therein is a block diagram of an exemplary embodiment of the IoT device 102. The IoT device 102 may include an application software 150, an operating system 152, the communications module 130, the power amplifier 154 and the detection circuit 134. The application software 150 rides on the operating system 152, that is, the application software 150 is executed within the operating system 152 environment by the processor 120. The operating system 152 then interfaces to the communications module 130 (see FIG. 2A). Four possible, but non-limiting, methods of protection are illustrated in FIG. 3. In one embodiment, the power amplifier 154 (of the transceiver 132) amplifies a signal from the communications module 130 to enable the signal to reach a wireless antenna 168.

In a first method, a transmission overlimit 156 (e.g., transmission time or data volume exceeds a predetermined threshold) can be detected at the Medium Access Control (MAC) level in the operating system 152 of the IoT device 102.

In a second method, the processor 400 of the detection circuit 134 can measure the bus monitor 408*d* and/or the power sensor 408*b* to determine whether a data volume of a transmission exceeds a predetermined transmission threshold to detect transmission overlimits 160 and generate a disable command 158 to disable the communications module 130 (see FIG. 2A) and/or the transceiver 132, such as, for example, sending a control signal having a deactivate command. In one embodiment, the disable command 158 may include a notification sent to an end user or a router alerting the end user or the router to block access to the WAN 106. In another embodiment, the disable command 158 may include a notification sent to a communication provider or a protocol command (such as a CDMA/GSM command) to block access to the WAN 106. In yet another embodiment, the disable command 158 may include a notification sent to an ecosystem provider instructing the ecosystem provider to block access of the IoT device 102 to the ecosystem. In some embodiments, the disable command 158 may be a control signal sent to the processor 350 of the power module 124 thus causing the processor 350 to actuate one or more control switch 362*a-n* thereby disabling the power from the components of the IoT device 102, such as by disabling the power connection of the processor 120, the memory 122, the sensor 126, the control device 128, the communications module 130, the transceiver 132, the detection circuit 134, or the timer 136 or some combination thereof. In another embodiment, the disable command 158 is a control signal sent to the processor 350 of the power module 124 causing the processor 350 to disable every power connection, thus powering down the IoT device 102.

An ecosystem provider, as used herein, refers to an IoT device control system or IoT device organizing system that coordinates, organizes, and/or controls communications between the controller 112 and one or more IoT device 102. In one embodiment, the ecosystem provider includes the controller 112 and, in some embodiments, includes the controller 112 integrated with one or more IoT device 102. Non-limiting examples of the ecosystem provider are the Google Nest or Google Assistant ecosystem (Google, LLS, Palo Alto, Calif.), Amazon Alexa (Amazon.com, Inc., Seattle, Wash.), and Insteon (Smartlabs, Inc, Irvine, Calif.). In one embodiment, the system 100 includes more than one controller 112, for example, a first controller 112 as a component of the ecosystem provider and a second controller 112 in communication with the ecosystem provider. In one embodiment, the system 100 further includes one or more ecosystem provider.

In a third method, the communications module 130 itself can be operable to detect transmission overlimits 162. For example, the communications module 130 may incorporate the detection circuit 134 and operate the detection circuit 134 within an isolated environment within the communications module 130, such as by isolating, or sand-boxing, processing done by the detection circuit 134 within a particular core of the processor 120 wherein the particular core is not accessible by the operating system 152 or the communications module 130, e.g., by isolating the core in firmware installed on the IoT device 102. Isolating the processing of a particular component of the IoT device 102 may also be referred to as quarantining the particular component and the particular component may be referred to as being quarantined. In one embodiment, the detection of transmission overlimits of the IoT device 102 may be performed by the controller 112 and/or the detection circuit 134 where the controller 112 and the detection circuit 134 are separate from the IoT device 102, e.g., the controller 112 and the detection circuit 134 are not integrated onto a single circuit.

In a fourth method, the processor 350 of the power module 124, as shown in FIG. 2B, can detect an increase in power consumption that is associated with transmissions by the communications module 130 and/or the transceiver 132 by measuring the power monitor of each control switch 362*a-n* associated with the communications module 130 and/or the transceiver 132, storing each measurement in memory 354, and comparing each measurement to a transmission power threshold, which may be based at least in part on the measurement in memory 354. In this embodiment, the power module 124 may include the processor 350, the memory 354, and one or more power control switch 362*a-n* having a power connection to either the communications module 130 or the transceiver 132, or both. In one embodiment, the power connection is selectively disabled to either the communications module 130 or the transceiver 132, or both, if the processor 350 of the power module 124 detects an attack, for example, if the processor 350 detects overlimits in power utilization 164. In this example, the power module 124 may include a normal power utilization model of normal power utilization, which may be stored, e.g., as data or computer instructions, in the one or more memory 354 of the power module 124 or may be stored in the memory 122, so that the processor 350 of the power module 124 can determine whether a sudden increase in power utilization fits within the normal power utilization model and, thus, whether the sudden increase in power utilization is within normal operations, or whether the sudden increase in power utilization is not normal operation and is likely the result of an attack. The normal power utilization model may include the transmission power threshold and/or the predetermined transmission threshold. Power consumption can be determined by the one or more control switch 362*a-n* using several known techniques, such as current measurement, and the determination may be performed by the one or more processor 350 of the power module 124 and/or the processor 120.

FIG. 2A illustrates the power module 124 as an integral part of the IoT device 102. However, as discussed above, in an exemplary embodiment the power module 124 can be external to the IoT device 102, e.g., the power module 124 is not positioned within the housing 142. For example, the power module 124 can be integrated into a power plug along with an external transformer and voltage regulator. Such external power supplies are common for small electronic devices. In some embodiments, the processor 350 of power module 124 is operable to monitor the power being drawn by the IoT device 102 by monitoring the power monitor of each control switch 362*a-n*, and cut off the power to the IoT device 102 responsive to an elevated level of power drawn by the IoT device 102 by actuating one or more control switch 362*a-n*. The approach of having an external power module 124 thus advantageously provides protection against an attack without modification to the IoT device 102.

It should be noted that most of the techniques described above operate independently of the operating system 152 and are thus not affected by possible bugs in the application software 150 or by virus attacks that can contaminate the application software 150 or the operating system 152 of the IoT device 102. Operating independently of the operating system 152 may include isolating one or more core of the processor 120 from the operating system 152, isolating a particular portion of the memory 122 from the operating system 152, executing the operating system 152 in hardware independent of one or more component of the IoT device 102a, or any other method known in the art to separate two or more application software 150 or operating system 152 operating on the same system, or some combination thereof. Regardless of software commands that may exist in the application software 150, if excessive transmissions are detected, the communications for the IoT device 102 are turned off, such as, by way of example, by use of the disable command 158, or the IoT device 102 itself is turned off, such as, by way of example, disabling the power module 124 and/or causing the power module 124 to disable the power connection for one or more component of the IoT device 102. In one embodiment, the techniques described above are implemented on analog circuitry, however, in other embodiments, the techniques described above are implemented on digital circuitry.

Once the IoT device 102 has been disabled, it may be re-enabled in a variety of different fashions. In one embodiment, a user interface 141 (see FIG. 2A) may be activated to indicate that the transceiver 132 (see FIG. 2A) has been disabled or that the IoT device 102 has been disabled or shut down. The user interface 141 may also provide a mechanism for the user to re-enable the transceiver 132 or reactivate the IoT device 102. In one embodiment, if the IoT device 102 is compromised, the IoT device 102 is "bricked", that is, the IoT device 102 is disabled from further use. In another embodiment, the user of the IoT device 102 may receive a notification regarding an issue with the IoT device 102 and further instructions. The further instructions may include a method for providing the IoT device 102 to a technician, for example but not by way of limitation, instructions for taking the IoT device 102 to the technician or instructions for mailing the IoT device 102 to the technician. In one embodiment, the user may be provided a patch or firmware update, e.g., an update to the application software 150 or an update to the operating system 152, wherein the patch or firmware update corrects the takeover of operation of the IoT device 102, thus overcoming the attack.

In another exemplary embodiment, the user interface 141 may be an indicator light, such as an LED on the IoT device 102, may be activated to indicate that the IoT device 102 has been disabled. In yet another alternative embodiment, the user must unplug or depower the IoT device 102 and plug it back in to re-enable the transceiver 132 and other circuit components. The IoT device 102 may also include a reset button as part of the user interface 141 that can be activated by the user to reset the IoT device, and/or a restart button as part of the user interface 141 that can be activated by the user to restart the IoT device. Activation of the reset button may cause the IoT device 102 to erase the memory 122 and reinstall the operating system 152 and the application software 150 from a "clean" source, e.g., a source which has not been compromised or infected. In one embodiment, the IoT device 102 includes a second memory 122 storing a clean source. In such an embodiment, the second memory 122 may be inaccessible by the application software 150 or the operating system 152. Activation of the restart button may cause the IoT device 102 to power cycle.

In yet another alternative embodiment, the transceiver 132 may be disabled for a predetermined period of time, e.g., by a control signal having a disable command sent via the control bus or by a control switch 362 causing the power connection to the transceiver 132 to be disabled. In this embodiment, the transceiver 132 is automatically re-enabled after a period of time. If the IoT device 102a-n is still under attack, the IoT device will detect the over limit parameter and once again disable the transceiver 132 or disable the entire IoT device.

Using the principles discussed herein, the IoT device 102 can detect and prevent an attack on the device in a number of ways. For example, the IoT device 102 may conform to the requirements of an Open Systems Interconnection (OSI) model of computer networking. The OSI model of computer networking is a seven-layer model including the following layers: 1. Physical layer; 2. Data link layer; 3. Network layer; 4. Transport layer; 5. Session layer; 6. Presentation layer; and 7. Application layer. The physical layer defines a manner of transmitting a bitstream of raw bits over a physical data link. The bitstream may be grouped into code words or symbols and converted to a physical signal that is transmitted over a transmission medium. The physical layer provides an electrical, mechanical, and procedural interface to the transmission medium. The shapes and properties of the electrical connectors, the frequencies to broadcast on, the line code to use and similar low-level parameters, are specified by the physical layer. The physical layer translates logical communication requests from the data link layer into hardware-specific operations to cause transmission or reception of electronic (or other) signals. Further, the physical layer supports higher layers responsible for generation of logical data packets. At the physical layer, wired and wireless versions of the communication module 130 (see FIG. 2A) can be operable to have a maximum rate and duration model set into the hardware of the device or stored in the memory 122 that are outside of software modification by the application software 250 or the operating system 252. In an exemplary embodiment, the radio (e.g., the hardware of the transceiver 132) can have internal settings based upon IoT type that limits the amount of data and/or length of time the transceiver 132 can transmit. For example, the IoT device 102, such as a temperature sensor IoT device, can be designed and built such that the hardware of the transceiver 132 is limited to only output average and peak output levels of data that would be needed for normal operation of the temperature sensor. A temperature sensor does not normally transmit megabytes of data on a continuous basis. Thus, the system parameter thresholds can be designed and built into hardware forming the physical layer of the IoT device 102a-n by the manufacturer based on the particular device type that cannot be modified by software. For example, the processor 400 of the detection circuit 134 may be outside of the physical layer of the IoT device 102, but be operable to detect and respond to excessive on-time for the transceiver 132 (see FIG. 2A) or power usage indicating excessive transmission.

The IoT type is a categorization of each IoT device 102a-n based on a function performed and/or an industry in which the IoT device 102 is used. Non-limiting examples of IoT types may include: Appliance, Automotive, Garden, Home and Office, Lighting and Electrical, Multimedia, Security, Sensors and Controls, Wearables and Health, and Wi-Fi and Networking, or some combination thereof. The IoT type may be further classified into subtypes of each type. For example only, an IoT device 102 having an IoT type of appliance may be further classified into one or more of HVAC, home appliance, and/or industrial grade appliance. Subtype examples have only been provided for the IoT type of appliances for the sake of clarity and simplicity; it is understood that every IoT type may include one or more subtype associated with the IoT type.

In one embodiment, the processor 400 of detection circuit 134 may detect excessive on-time for the transceiver 132 by measuring a temperature of the transceiver 132. For example, the detection circuit 134 may include a detection circuit temperature sensor 408a, which may be separate from the sensor 126, to determine a temperature of the transceiver 132. Because the transceiver 132 may increase in temperature dependent on time of operation, the longer the transceiver 132 is actively transmitting along the communication link 108, the higher the temperature of the transceiver 132 will become. If the temperature, as measured by the detection circuit 134 temperature sensor 408a, exceeds a temperature threshold, the processor 400 of the detection circuit 134 may make a determination that the IoT device 102 has been compromised. In one embodiment, temperature of the transceiver 132 may be a system parameter having a temperature threshold stored in the transmission model.

In another embodiment, the processor 400 of the detection circuit 134 may detect excessive on-time for the transceiver 132 by determining a power level used to power the transceiver 132 by measuring the power sensor 408b. Determining the power level used to power the transceiver 132 may include either communicating with the power module 124 to determine a length of time during which power is supplied to the transceiver 132 or measuring a current being supplied by the power module 124 to the transceiver 132, for example. If the power level used to power the transceiver 132 exceeds a power level threshold for a period of time exceeding an on-time threshold, the detection circuit 134 may determine there is an excessive on-time for the transceiver 132, and thus, that the IoT device 102a-n has been compromised. In one embodiment, on-time of the transceiver 132 may be a system parameter having an on-time threshold stored in the transmission model.

In another embodiment, the processor 400 of the detection circuit 134 may detect excessive on-time for the transceiver 132 by monitoring, or measuring with a photodetector 408c, the LED of the IoT device 102 and a logged data indicative of the received light over time. The processor 400 may then determine, based in part on the logged data of the photodetector 408c, whether the on-time of the transceiver 132 exceeds an on-time threshold, and thus, that the IoT device 102 is determined to have been compromised.

As discussed above with respect to FIG. 3, the software MAC, which interfaces to the PHY layer, can have similar rate and time detection and throttling abilities, but this might be able to be compromised by a software attack. The MAC is usually lower in the operating system and is usually more difficult to hack.

In one embodiment, the detection circuit 134 may use side-channel analysis to determine whether the IoT device 102 is compromised. Side-channel analysis is a non-invasive approach using an indirect technique to determine what action is being taken. Here, each IoT device 102 may include a security model having one or more models including a processing time model, a power consumption model, a radio emissions model, and a digital bus model.

In one embodiment, the processing time model may include system parameters relating to whether a key negotiation is using a hardware-based security engine or a software-based security engine and an acceptable duration of the key negotiation. Generally, the hardware-based security engine will execute more quickly than the software-based security engine. Most security engines will dither the power supply to mask operations being executed, whereas the software-based security engine, executing on the processor 120, will not include power dithering. For example, the detection circuit 134, having access to the data bus 138, may determine when the IoT device 102 should perform a key negotiation, and, upon determining that a key negotiation should be performed, measure a key negotiation duration, e.g., a number of clock-cycles of the processor 120 or a time from the timer 136. The detection circuit 134 may then compare the key negotiation duration to the processing time model to determine whether the key negotiation duration is within the acceptable duration. If the key negotiation duration is not within the acceptable duration, the IoT device 102 or the detection circuit 134 may determine that the IoT device 102 is compromised or infected.

In one embodiment, the power consumption model may include one or more system parameter relating to a normal power consumption range needed by the IoT device 102 during cryptographic operations. For example, the detection circuit 134 may measure a power consumed by the processor 120, or other component of the IoT device 102, during cryptographic operations. The detection circuit 134 may then compare the measured power consumption to the normal power consumption range of the power consumption model. If the measured power consumption is greater than or less than the normal power consumption range, the IoT device 102 or the detection circuit 134 may determine that the IoT device 102 is compromised or infected. In one embodiment, the power consumption model is more applicable when the IoT device takes similar steps in a similar order when executing a cryptographic operation.

In one embodiment, the radio emissions model may include one or more system parameter relating to what, if any, radio emissions are generated by a memory interface, e.g. memory 122 when accessed via the data bus 138. The radio emissions model may be more applicable when the IoT device 102 takes particular steps in a consistent order when a particular operation is executed. For example, the detection circuit 134 may include one or more sensor to measure radio emissions. The detection circuit 134 may compare measured radio emissions to the one or more system parameter of the radio emissions model to determine whether a particular operation has been executed, e.g., whether a read or write operation has been performed on the memory 122, and whether that particular operation was expected to occur. If the detection circuit 134 determines that the particular operation was incorrectly executed or was not executed at an appropriate time, the IoT device 102 or the detection circuit 134 may determine that the IoT device 102 is compromised or infected.

In one embodiment, the digital bus model includes one or more system parameter regarding one or more access pattern of the data bus 138 between one or more of the processor 120, the transceiver 132, the memory 122, the power module 124, the timer 136, the communications module 130, the sensor 126, and/or the control device 128, or some combination thereof, for any particular operation performed by the IoT device 102. Each access pattern may include information regarding the one or more component accessing the data bus 138 as well as metadata about the access such as, for example, whether the access is a read/write access, an address location of the access, or the like. For example only, the digital bus model may include a system parameter indicating that for a temperature reading operation, the processor 120 accesses the sensor 126, stores a reading to the memory 122, then transmits the reading using the communications module 130. The detection circuit 134 may monitor a particular temperature reading operation and, if the particular temperature reading operation includes additional access between components, fewer access between components, or access between components different from the order provided by the digital bus model, the IoT device 102 or the detection circuit 134 may determine that the IoT device 102 is compromised or infected.

In one embodiment, the security model, including the processing time model, the power consumption model, the radio emissions model, and the digital bus model, is either provided by the IoT device 102 manufacturer or may be generated in a testing lab. In one embodiment, the security model further includes a secure boot model, a packet processing model, a malformed response time model, a power up time model, a wake-up time model, a physical event time model, and/or a tamper detection model.

In one embodiment, the secure boot model may include a system parameter for validation of the software stored in the memory 122, such as the application software 150 and the operating system 152, a system parameter for decryption of the application software 150, a system parameter for a boot jump vector memory location, and a system parameter for validation time based on use of the hardware-based security engine and a known code size. For example, the secure boot model may be provided by the manufacturer, or otherwise generated, and stored within the IoT device 102 and/or detection circuit 134. In one embodiment, the IoT device 102 or the detection circuit 134 includes an authentic indicator for the application software 150 and/or the operations system 152. In one embodiment, the authentic indicator is a true hash of the application software 150 and/or the operating system 152 and is stored separately from the memory 122. The detection circuit 134 may generate a test hash of the operating system 152 and/or application software 150 and compare the test hash against the true hash. If the test hash and the true hash are identical, it is unlikely the operating system 152 and/or application software 150 has been modified whereas, if the test hash and true hash are different, it is likely the operating system 152 and/or application software 150 have been modified since the true hash was generated, and the IoT device 102 or the detection circuit 134 may determine that the IoT device 102 is compromised or infected.

In one embodiment, the packet processing model may include one or more system parameter such as a packet decryption time having a range of expected times it would take the IoT device 102 to decrypt a particular data packet, a packet processing time having a range of expected times it would take the IoT device 102 to process the particular data packet, a packet response generation time having a range of expected times it would take the IoT device 102 to generate a response to the particular data packet, and a packet response encryption time having a range of expected times it would take the IoT device 102 to encrypt the response to the particular data packet. For example, the detection circuit 134 may measure one or more of a packet decryption time, a packet processing time, a packet response generation time, and a packet response encryption time. The detection circuit 134 may then compare each of the packet decryption time, the packet processing time, the packet response generation time, or the packet response encryption time or some combination thereof to the range of expected times in each respective model. If the measured time exceeds the range of expected times for a particular model, the IoT device 102 or the detection circuit 134 may determine that the IoT device 102 is compromised or infected.

In one embodiment, the malformed response time model includes one or more system parameter having a range of expected times it would take the IoT device 102 to respond to a malformed data packet. For example, the IoT device 102, having a known hardware configuration and known application software 150, may include the malformed response time model, either from the manufacturer or otherwise generated, with a system parameter indicating that the IoT device 102 should respond to the malformed data packet within a target time range between a first time and a second time, the second time being greater than the first time. The detection circuit 134 may measure the malformed data packet response time of the IoT device 102 and, if the malformed data packet response time is lesser than the first time or greater than the second time, the IoT device 102 or the detection circuit 134 may determine that the IoT device 102 is compromised or infected.

In one embodiment, the power up time model includes one or more system parameter having a range of expected times it would take the IoT device 102 to power up from a powered-off, or no-power, state. For example, the IoT device 102, having a known hardware configuration and known application software 150, may include a power up time model, either from the manufacturer or otherwise generated, with a system parameter indicating that the IoT device 102 should power-up for a time-period greater than a first time and lesser than a second time. The detection circuit 134 may measure a power-up time of the IoT device 102 and, if the power up time is lesser than the first time or greater than the second time, the IoT device 102 or the detection circuit 134 may determine that the IoT device 102 is compromised or infected.

In one embodiment, the wake-up time model includes one or more system parameter having a range of expected times it would take the IoT device 102 to wake-up from a hibernated, or low-power, state. For example, the IoT device 102, having a known hardware configuration and known application software 150, may include the wake-up time model, either from the manufacturer or otherwise generated, with a system parameter indicating that the IoT device 102 should wake-up for a time-period greater than a first time and lesser than a second time. The detection circuit 134 may measure a wake-up time of the IoT device 102 and, if the wake-up time is lesser than the first time or greater than the second time, the IoT device 102 or the detection circuit 134 may determine that the IoT device 102 is compromised or infected.

In one embodiment, the security model may include a ping time model. The ping time model may include one or more system parameter indicating a normal ping duration. For example, the detection circuit 134 may ping a particular server for which the normal ping duration is known and measure a ping response time. The detection circuit 134 may then compare the ping response time against the normal ping duration and if the ping response time is different from the normal ping duration, the IoT device 102 or the detection circuit 134 may determine that the IoT device 102 is compromised or infected. In one embodiment, the normal ping duration may include be a range of normal ping durations and the detection circuit 134 may compare the ping response time against the range of normal ping durations. If the ping response time is outside the range of normal ping durations, the IoT device 102 or the detection circuit 134 may determine that the IoT device 102 is compromised or infected.

In one embodiment, the security model may be used with the IoT device 102 to determine whether the IoT device 102 is in compliance with the security model, e.g., to determine whether the IoT device 102 implements the security model as expected. For instance, the security model may be used to verify the IoT device 102 implements encryption in a particular manner by implementing the security model with the IoT device 102 and operating the IoT device 102 in a normal manner. The detection circuit 134 may then determine whether the IoT device 102 is in compliance with the security model similar to how the detection circuit 134 determines the IoT device 102 has been compromised or infected as described in more detail above.

In another approach, one or more battery for the power module 124 (see FIG. 2B) in IoT device 102 could include circuitry and be built with machine learning that learns the normal power utilization model and detects excessive power consumption. For example, one or more machine learning models may be stored in the memory 354 and implemented by the processor 350. If power consumption exceeds the normal power utilization model, the processor 350 of the power module 124 can disable one or more power connection or power cycle (e.g., turn off and/or force a device restart) of the IoT device 102. In one embodiment, the circuitry may include the processor 350 and the memory 354 wherein the processor 350 determines if power consumption exceeds the normal power utilization model, which may be stored in the memory 354, and the processor 350 detects excessive power usage based at least in part on the power monitor of one or more control switch 362*a-n*. In another embodiment, the processor 350 of the power module 124 accesses, in a manner isolated from the other components of the IoT device 102 and/or isolated from the operating system 152, the application software 150, the processor 120, and the memory 122 to determine if power consumption exceeds the normal power utilization model and detect excessive power consumption. In one embodiment, the circuitry is separate from the one or more battery. In another embodiment, the circuitry is integrated into the power module 124.

The use of the normal power utilization model associated with data transmission has been discussed above. Model building could be done with machine learning or other algorithms developed by outside computer systems and preprogrammed into the IoT device 102 such as by storing the algorithms in the memory 122. Alternatively, the IoT device 102, itself, can be built with machine learning, such as by including machine learning software in the application software 150 that causes the processor 120, the processor 350, or the processor 400 to learn the normal power utilization model and normal usage frequency model wherein "normal" signifies power utilization and usage frequency of the IoT device 102 while not compromised and not infected. This principle can also be extended to include time of day and day of week as part of modeling. Such models can be predetermined for each IoT device 102*a-n* and IoT type based on algorithms developed by outside computer systems or developed by the processor 120, the processor 350, or the processor 400 of IoT device 102, itself, with machine learning that learns the normal power utilization model and normal usage frequency model throughout the day and week to develop a power-time model. This power-time model can be used in conjunction with the normal power utilization model discussed above to detect excessive power usage based on the time/day.

For example, if a particular IoT device 102*a-n* has an IoT type of Sensors and Controls and a subtype of thermostat, then the particular IoT device 102*a-n* may include a sensor 126 of a temperature probe. A normal power utilization model may be formed for the particular IoT device 102*a-n* that determines the particular IoT device 102*a-n* utilizes a first power to normally transmit data from the sensor 126. The normal usage frequency model may be formed for the particular IoT device 102*a-n* that determines the particular IoT device 102*a-n* normally records data from the sensor 126 then transmits the data once every specific period of time. Thus, the particular IoT device 102*a-n* can determine that it has been compromised or infected if, for example, the processor 400 of the detection circuit 134 measures a usage frequency different from the specific period of time of the normal usage frequency model for either recording data or transmitting data by measuring the bus monitor 408*d* and/or measures a second power measured by the power sensor 408*b* that is different from the first power of the normal power utilization model as stored in the memory 404.

In one embodiment, a transmission time model may be established by calculating, by the processor 404, a typical transmission time for both an inactive device period (i.e., when the IoT device 102 is inactive) and an active device period (i.e., when the IoT device 102 is active). An active period denotes a time frame in which the IoT device 102 is performing expected operations and is expected to be transmitting data as a result of those operations. The active period can have multiple levels of activity in which each level of activity has one or more operational parameter that is known and expected. In this embodiment, the processor 400 is operable to monitor multiple levels of activity of the activity module 140 and/or the communications module 130, and to establish a first active parameter threshold value when the activity module 140 and/or the communications module 130 is at a first activity level, and a second parameter threshold value when the activity module 140 and/or the communications module 130 is at a second activity level, and wherein the processor 400 is operable to curtail the volume of communication of the communication module 130 on the computer network if the system parameter exceeds the first active parameter threshold value when the activity module 140 and/or the communications module 130 is at the first activity level, or the system parameter exceeds the second active parameter threshold value when the activity module 140 and/or the communications module 130 is at the second activity level. Exemplary levels of activity include a trickle activity level, a normal activity level and a hyper activity level. A trickle activity level would have one or more operational parameter that is greater than the operational parameter when the component(s) of the IoT device 102 are inactive, and may be accomplished in a sporadic fashion. An example of a trickle activity at a trickle activity level is maintaining a wireless connection by periodically broadcasting a message by the communication module 130 and the transceiver 132 to indicate that the communication module 130 and the transceiver 132 are operable to communicate on the communication link 108. A normal activity at a normal activity level include operations that require greater power consumption and/or operational parameters (e.g., clock cycles or transmission time) than a trickle activity, but less than a hyper activity. The normal activity may be due to operations of the activity module 140, such as temperature monitoring by the sensor 126, or temperature control by the control device 128. A hyper activity would require greater power consumption and/or operational parameters (e.g., clock cycles or transmission time) than the normal activity. Examples of a hyper activity include video or sound streaming or data downloading by the activity module 140 and/or the communications module 130 due to a software update. In each of these activities, the operational parameters including power consumption, temperature, temperature change, clock cycles or transmission time is known in advance and is predictable. Although only three different levels of activity are described herein, it should be understood that more or less levels of activity can be monitored by the detection circuit 134 of the IoT device 102.

An inactive period denotes a time frame in which the IoT device 102 is not performing expected operations, but may still be transmitting data as a result of other housekeeping operations. The inactive period can have at least one level of activity in which each level of activity has one or more operational parameter that is known and expected. In this embodiment, the processor 400 is operable to monitor each level of activity of the activity module 140 and/or the communications module 130 during the inactive period, and to establish an inactive parameter threshold value when the activity module 140 and/or the communications module 130 is at a particular activity level, and wherein the processor 400 is operable to curtail the volume of communication of the communication module 130 on the computer network if the system parameter exceeds the inactive parameter threshold value when the activity module 140 and/or the communications module 130 is at the particular activity level. For example, a temperature sensing IoT device 102 may sleep and wake up every five seconds to measure the current temperature. The temperature sensor can be operable to report every temperature reading or report temperature only when it has changed from the prior reading by a predetermined amount (e.g., at least one degree Fahrenheit) and this may be considered a normal activity. If the communication module 130 and/or the transceiver 132 only reports temperature changes, as described above, the temperature change transmissions will be intermittent and unpredictable. However, the amount of data transmitted in such a transmission is known and predictable. The temperature sensing IoT device 102 may also send short periodic transmissions (e.g., trickle activity every five minutes) to confirm that the temperature sensing IoT device 102 is operational and has connectivity. Both the frequency and size of these active data transmissions is known and predictable. Because of the nature of the temperature sensing IoT device 102, there is no expected activity of any sort during the inactive period. Thus, an active device model for the temperature sensing IoT device 102 would include periodic (e.g., trickle activity every five minutes) short bursts of data and a periodic data transmission (e.g., normal activity) of greater duration to report temperature changes. In one embodiment, the temperature sensing IoT device 102 may also receive software updates and send acknowledgement messages for block by block data transfers, which may be considered hyper activity. The active device model can also include such acknowledgement messages in response to data downloads. On the other hand, an inactive device model for the temperature sensing IoT device 102 would indicate that no transmissions should occur. In this manner, the processor 400 of the detection circuit 134 can determine if the temperature sensing IoT device 102, or other IoT device 102 implementing the transmission time model, the active device model, or the inactive device model, or some combination thereof, is a member of an attack by determining whether transmissions are occurring during the inactive period of the inactive device model of the transmission time model or whether transmissions are occurring outside the period of the active period of the active device model of the transmission time model. In one embodiment, the active device model and the inactive device model are included in the transmission time model.

An IoT device 102a-n having a different IoT type, such as an IoT type of multimedia and subtype of video camera, e.g., a video IoT device 102, may need to maintain a network connection even when the device is in an inactive state. Those skilled in the art will appreciate that a network connection, via routers, gateways, firewalls, and the like, may time out if there is a lack of data transmission for a predetermined period of time (e.g., 30 seconds). It is desirable to have an ongoing network connection as soon as the IoT device 102 enters the active period so that it can immediately transfer data using the existing network connection. Having the ongoing network connection may also avoid the need for a cryptographic handshake that may consume greater power and bandwidth than merely keeping the session alive. In this example, the communications module 130 (see FIG. 2A) of the video IoT device 102 can transmit data via the transceiver 132 in order to maintain the network connection even though the sensor 126 (e.g., the video camera) of the video IoT device 102 is in an inactive period. The video IoT device 102, and any IoT device 102a-n, would have a device model for both the active and inactive states of operation of the IoT device 102a-n. The active device model may include longer bursts of data at the rate at which the video IoT device 102 is programmed to wake up and transmit video data (e.g., every minute for 10 seconds). In contrast, the inactive device model for the video IoT device 102 in the inactive period may still include transmissions, but the transmissions are shorter in duration and occur at a known rate.

In one embodiment, these transmission times may be determined over a plurality of transmissions made by a particular IoT device 102a-n. In this manner, it is possible to develop the transmission time model that shows a typical transmission time for the particular IoT device 102a-n in both active periods of time and inactive periods of time.

In one embodiment, a measured value of a system parameter of one or more component of each IoT device 102a-n may be made by each IoT device 102a-n and may be used to determine whether the IoT device 102 is infected or otherwise compromised. For example, during operation of the IoT device 102, a measured value, such as a transmission time, may be calculated for the current transmission, e.g., may be calculated by the processor 120, the processor 350, and/or the processor 400 which may be in communication with the timer 136. The IoT device 102, e.g., the processor 120, the processor 350, and/or the processor 400 then determines whether is an inactive period of operation or active period of operation. The current transmission time is measured, such as with the bus monitor 408d or the temperature sensor 408a, and can be compared against the active device model of the transmission time model when the IoT device 102 is in an active period (or the current transmission time can be measures and compared against the inactive device model of the transmission time model when the IoT device 102 is in an inactive period) to produce a difference measurement between actual transmission time and expected, e.g., model, transmission time. If the difference between the actual transmission time and expected transmission time is greater than a predetermined threshold, the transceiver 132 (see FIG. 2A) is disabled, such as by sending a disable command, sending a control signal having a disable command, or causing the processor 350 to disable the power connection of the transceiver 132. Similar parameter measurements may be made with respect to transmission data rates, power consumption, or any other measured value of a system parameter of each component of the IoT device 102. As discussed above with respect to FIG. 3, measured values of system parameter(s) may include a measurement of an increase in power supply current going to the transceiver 132 or a determination of the radio frequency (RF) energy measurement (not demodulated). In yet another embodiment, the processor 400 of the detection circuit 134 may be coupled to a control line of the control bus of the system bus 138 that enables the transceiver 132 (see FIG. 2A) via the bus monitor 408*d* or an indicator, such as an LED to indicate the activity of the transceiver 132 and detects transceiver operation by sensing a signal level on that control line via the bus monitor 408*d* and/or indicator via the photodetector 408*c*. Each of these system parameters provides an indication of the activity of the communications module 130 and/or the transceiver 132. In one embodiment, each of the measured value(s) of the system parameter(s) discussed above may result in one or more parameter model. Each parameter model may then be used, as discussed in more detail below, to determine whether a particular IoT device 102*a-n* is infected or compromised.

Figure 4:
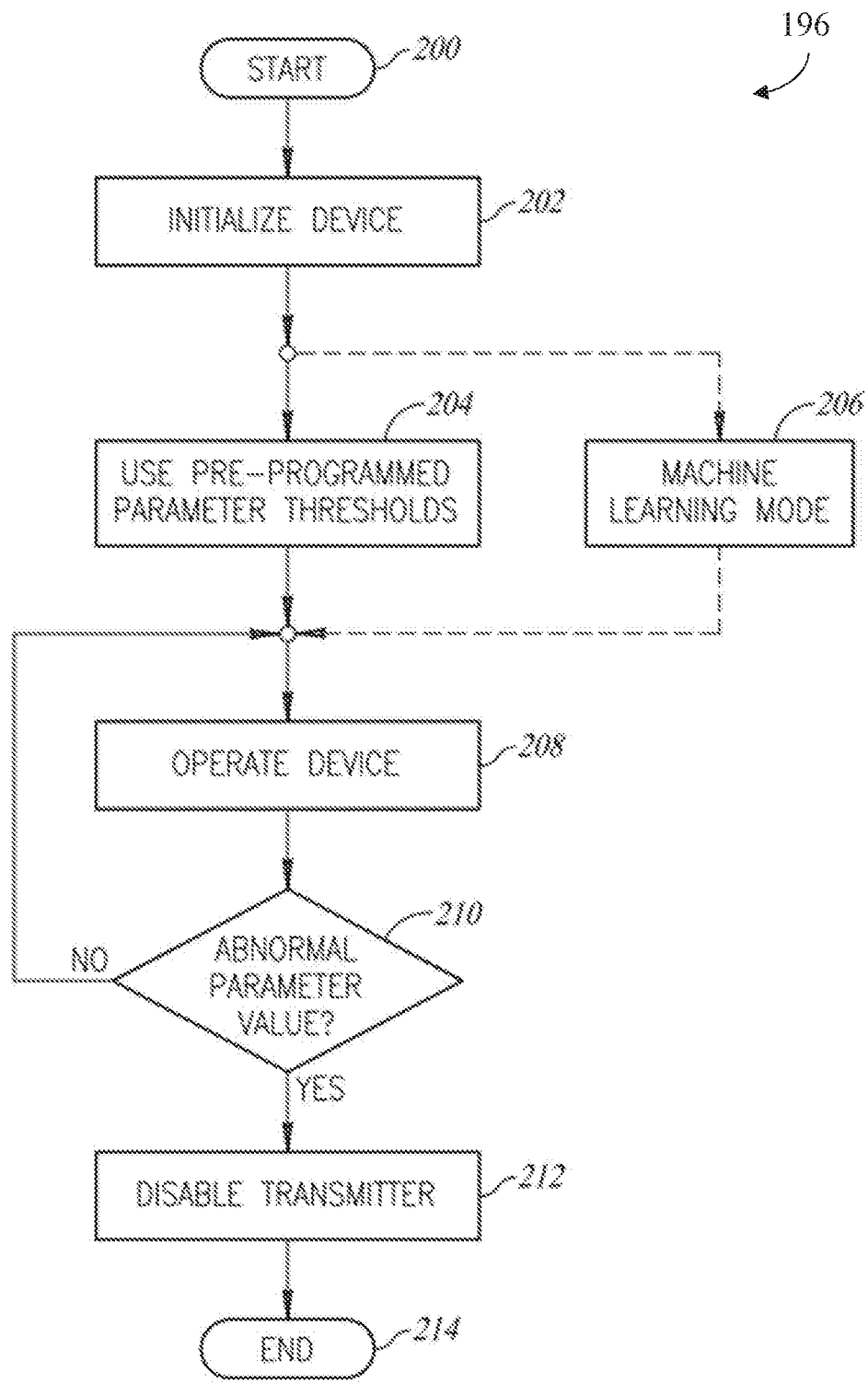
FIG. 4 is a flowchart illustrating the operation of an IoT device constructed in accordance with the present disclosure.

An example of an operation process 196 of one or more IoT device 102*a-n* is illustrated in the flow chart of FIG. 4. At a start 200, the IoT device 102 is ready for installation. In step 202, the user initializes the IoT device 102. This includes providing power to the IoT device 102, such as by connecting a power source 358 to the power module 124, and may further include set-up of the communications module 130 (see FIG. 2A). In one embodiment, the user may use the user interface 141 to initialize the IoT device 102. In step 204, the IoT device 102 is operable for operation with pre-programmed parameter data and/or one or more parameter model. As previously discussed, the IoT device 102 can be initialized with predetermined thresholds dependent on the device type, e.g., a device model. Alternatively, the IoT device 102 can be initialized in a machine learning mode in step 206. In this embodiment, the IoT device 102 operates for a period of time and IoT device 102, e.g., the processor 120, the processor 350 or the processor 400, "learns the normal or nominal ranges for one or more operational parameter, such as length of time for data transmissions and quantities of data in both active and inactive modes, thus forming one or more model including, but not limited to, the rate and duration model, the power model, the power-time model, the active device model, the inactive device model, and/or the transmission time model. The one or more model can be stored in the memory 122, or can be stored in the memory 354, or can be stored in the memory 404. Each learned parameter can be used to develop one or more threshold for triggering a transceiver shutdown or a device shutdown. The IoT device 102 can be operable in the machine learning mode to learn normal ranges for operational parameters and then set one or more threshold for some level related to the normal ranges. For example, the threshold for triggering an alert could be set at a percentage (e.g., 0%, 10%, 15%, etc.) above the normal range as determined by the one or more model. Based on machine learning, it is also possible to factor in a time parameter, such as operation of the IoT device 102 or one or more component of the IoT device 102 above a threshold value for a predetermined period of time. For example, in normal operation, the transceiver 132 of the IoT device 102 may occasionally transmit a burst of data that results in the measured value exceeding the threshold value, but only for a short period of time (e.g., 100 milliseconds). In this example, the processor 120 of the IoT device 102 or the processor 400 of the detection circuit 134 learns the pattern of normal operation and will trigger a transceiver shutdown or a device shutdown if the transceiver 132 operates above the threshold value, e.g., outside the model, for a time period greater than 100 milliseconds, for example. As noted above, the actual transmission rate can also be a measured value of a system parameter. For example, the transmission rate model indicates that the transceiver 132 of IoT device 102 normally transmits data every five minutes. If the rate of transmission is more frequent than every five minutes, by some measured threshold, then the transceiver 132 can be shut down.

In yet another alternative embodiment, the IoT device 102 can be pre-programmed with system parameter values and threshold values, e.g., models, in step 204, for initial operation. During that period of initial operation, the IoT device 102 may also be in the machine learning mode (step 206) and learn the normal operational values for the particular device, e.g., learn one or more model. At some point in time, when the learning process is complete, the machine learned values can replace the initial pre-programmed values within the model so that subsequent operation of the IoT device 102 is controlled by the learned system parameter values and threshold values for that specific IoT device.

In one embodiment, the IoT device 102 can receive the system parameter values and threshold values, e.g., models, from one or more other IoT device 102 or from the controller 112.

In step 208, the IoT device 102 is operational. In addition to its normal operation functions, which are dependent on IoT type, the IoT device 102 detection circuit 134 is also monitoring operation of the IoT device 102 to detect possible attacks. In decision 210, the detection circuit 134 or the power module 124 determines whether any system parameter value during operation (e.g., trickle activity, normal activity or hyper activity) has exceeded its threshold value, e.g., is inconsistent with its model. As noted above, determining whether an operation parameter value has exceeded its threshold can include a number of factors, such as the actual parameter value, threshold for that parameter, time, time/day, active/inactive status, and the like.

If the IoT device 102 is not operating with any abnormal parameter values, the result of decision 210 is NO. In that event, the process returns to step 208 where normal operation of the IoT device 102 continues. If the IoT device 102 or the processor 400 of the detection circuit 134 or the processor 350 of the power module 124 detects any abnormal parameter values, the result of decision 210 is YES. In that event, the IoT device 102 may be considered compromised or infected and the IoT device 102 disables the transceiver 132 (see FIG. 2A) in step 212. As noted above, alternatively or in addition to disabling the transceiver 132, if the IoT device 102 exhibits abnormal behavior, the processor 400 of the detection circuit 134 can also send a control signal to the power module 124 to force a shutdown of the IoT device 102 or force a restart of the IoT device 102. In one embodiment, the IoT device 102 disables the transceiver 132 for a predetermined period of time or shuts down the entire IoT device 102 for a period of time. Alternatively, the IoT device 102 generates a notice for a user interface 141 indicating device shutdown that requires a user restart operation. In yet another alternative embodiment, the user must manually restart the IoT device 102 by unplugging and plugging the power supply 138 of the power module 124 or by activating a restart button of the user interface 141. In other embodiments, the user must manually reset the IoT device 102 by activating the reset button of the user interface 141. The operation process 196 ends at 214.

In one embodiment, the decision 210 may detect an abnormal parameter value, but may result in a YES after additional diagnostics is performed. One nonlimiting example may be a situation where the IoT device 102 having the communication link 108 experiences a failure of the communication link 108. Here, the processor 120 of the IoT device 102 may continue to retrieve a value from each of the one or more sensor 126 and store the value in the memory 122. When the communication link 108 is reestablished, the processor 120 may cause the communications module 130 to transmit the value in the memory 122 and any current sensor 126 data. In such a situation, the transceiver 132 may exceed parameters of the one or more model as such a situation may be uncommon. However, diagnostic steps may include determining whether there has been a recent communication link failure which may result in a need to transmit additional data. Thus, in order to mitigate false determinations that the IoT device 102 has been compromised, the decision 210 perform additional diagnostics resulting in the IoT device 102 waiting for the abnormal parameter value to be present for a particular amount of time before resulting in YES. In one embodiment, if the result of the decision 210 is YES, the IoT device 102 may be considered compromised.

In one embodiment, during the operation of the device (step 208), the processor 120 of IoT device 102 or the processor 400 of the detection circuit 134 may execute the decision 210 to determine the presence of an abnormal parameter value at predetermined intervals or at a period of time after a particular event has occurred. For example only, the processor 120 of the IoT device 102 and/or the processor 400 of the detection circuit 134 may execute the decision 210 after every sensor reading or before every communication is transmitted via the transceiver 132 to the controller 112 or the processor 120 of the IoT device 102 and/or the processor 400 of the detection circuit 134 may execute the decision 210 one or more times after a predetermined period of time.

In one embodiment, decision 210 may be performed by the controller 112 and/or the ecosystem provider. In such an embodiment, the controller 112 and/or the ecosystem provider is positioned within the system 100a to quickly identify one or more infected IoT device 102. In one embodiment, the controller 112 and/or the ecosystem provider may notify the user of any abnormal parameter value before proceeding to step 212, disabling the transmitter, e.g., disabling the infected device 102.

In one embodiment, step 204, step 206, decision 210, and step 212 are conducted by processor 400 of the detection circuit 134. In steps 204 and 206, the processor 400 of the detection circuit 134 may initialize the one or more model including, but not limited to, the rate and duration model, the power model, the power-time model, and/or the transmission time model. The processor 400 can develop thresholds for triggering a transceiver shutdown or a device shutdown based at least in part on the one or more model. In decision 210, the processor 400 may monitor one or more component of the IoT device 102, e.g., via one or more detector 408a-n to determine whether the one or more component is operating outside any of the one or more model. If the detection circuit 134 processor 400 determines that one or more component is operating outside the component's model, the processor 400 may, as discussed above in more detail, cause a control signal to be sent to the power module 124 to disable the power connection of one or more component of the IoT device 102 and/or may cause a control signal to be sent to the transceiver 132 to cause the transceiver 132 to shut down. In one embodiment, the processor 400 may then generate a notice for the user, such as by the user interface 141, indicating IoT device 102 or transceiver 132 shutdown that requires a user restart operation. In another embodiment, the user must manually restart the IoT device 102a-n by unplugging and re-plugging the power supply 358 to the power module 124, or by activating a restart mechanism, e.g. activating a restart button of the user interface 141, or sending a restart command to the processor 120 or the power module 124 thereby causing the IoT device 102 to power cycle, or restart. In another embodiment, the user must reset the device, e.g., by activating a reset mechanism such as activating a reset button of the user interface 141 or by sending a reset command to the processor 120 thereby causing the IoT device 102 to reset.

Thus, each IoT device 102a-n can self-monitor operations to quickly detect any abnormal operation indicative of an attack and take immediate measures to prevent and/or mitigate the takeover of the IoT device 102. Furthermore, the operation process 196 may be said to be protocol agnostic, that is, the operation process 196 may be performed regardless of the network topology used to implement the WAN 106 or used to implement the one or more communication link 108a-n.

In one embodiment, the operation process 196 of the IoT device 102a-n may further include executing the pause routine before disabling the transceiver 132 (step 212). If the IoT device 102 has been infected or compromised, such IoT device 102 is referred to herein as an infected device. The infected device may also be referred to as the sending device. The infected device may attack another device, such as another one of the IoT devices 102, and such device being attacked is referred to herein as a target device. The target device may also be referred to as the receiving device. For Internet Protocol (IP)-based systems, the sending device of IP traffic using protocols such as UDP and TCP is required to accept a new PAUSE command from the receiving device of network traffic. The PAUSE command may be used to pause the transmission of network traffic for a sufficient amount of time to stop or mitigate an attack. Executing the pause routine may include either performing a sender filtering process 250 or a receiver filtering process 300, each described in more detail below.

At present, consumers with an Internet presence can receive data from any source with no control by the receiving system. That is, anyone can send data to the consumer. Consumers are familiar with the term "call blocking" as it relates to telephone calls. The consumer can initiate call blocking for an incoming telephone number from which the consumer does not wish to receive any calls. The present disclosure provides consumers with the network equivalent of call blocking because it gives the user the opportunity to indicate that the receiving system does not wish to receive data from a particular incoming IP address.

In the telephone example, call blocking is initiated by the end-user, but is typically implemented by the telephone service provider. In the network embodiment, it is advantageous to block the undesired data transmission as close to the source as possible. As will be described herein, in one embodiment the "call blocking" occurs at the sending device itself. Thus, the sending device can still be commanded to stop sending data even if it has become a virus infected BotNet device. If the BotNet device is part of a local area network (LAN), the "call blocking" may occur at a hub, controller, gateway, firewall or equivalent device where the LAN connects to a wide-area network (WAN).

In an exemplary embodiment, the sending device, e.g., an infected device, could be commanded to "Throttle", "Pause", or "Turn Off" by the receiving device, e.g., target device. The term "throttle" refers to a reduction in a transmission rate of the network traffic. For example, the sending device could be commanded to send one or more data packet no more than every 5 minutes, every 10 minutes, and the like. The term "Pause" refers to a temporary cessation in transmission of data packets. For example, the sending device could be commanded to stop sending data packets for a pause period, such as, but not limited to, of 5 minutes, of 10 minutes, and/or the like. In one embodiment, the pause period could extend for a sufficient period of time that the communication session times out and the active network connection is broken and/or terminated. The term "Turn Off" refers to a permanent cessation in the transmission of data packets from the sending device. For example, the sending device could be commanded to stop sending data to the receiving device. For the sake of convenience, these alternative transmission control commands are referred to herein as a PAUSE command.

Figure 5:
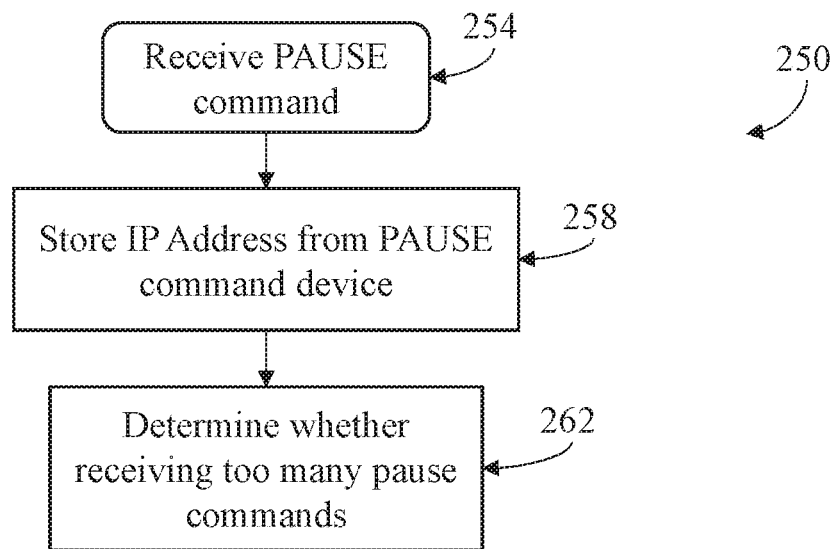
FIG. 5 is a diagram of an exemplary embodiment of a sender filtering process.

Referring now to FIG. 5, shown therein is a process flow diagram of an exemplary embodiment of the sender filtering process 250. Generally, the sender filtering process 250 comprises the step of: receiving, by the communications module 130 of the sending device, a PAUSE command from the receiving device (step 254); storing, by the processor 120 of the sending device and/or the controller, an IP Address of the receiving device that sent the PAUSE command into the memory 122 (step 258); and determining, by the processor 120 of the sending device and/or the controller and based at least in part on the IP Address stored in memory, whether the sending device has been compromised. In one embodiment, after completion of the sender filtering process 250, the operation process 196 may continue at step 212, disabling the transmitter.

In one embodiment, the processor 120 of the sending device can perform the sender filtering process 250 to store one or more IP address from which it has received a PAUSE command into the memory 122. For example, if more than one receiving device sends the PAUSE command, the IP address of each receiving device may be stored in the memory 122 by the processor 120. In one embodiment, if the sending device is part of a LAN, such as the LAN 114 in FIG. 1B, the controller 112 (or, alternatively, firewall, gateway, and/or the like), can store one or more IP address from which it has received a PAUSE command. The sending device would hold a sufficient number of receiver IP addresses so that a distributed attack could be minimized. Similarly, if the IP interface layer detects this type of behavior, the IP interface layer could completely shut off IP access to the receiving device until the currently blocked IP address timed out, as described above.

In one embodiment, the sender filtering process 250 is executed outside of the application software 150, which could be compromised in an attack, and may be executed in either a separate processor, a hardware-based control, or a secured execution zone. In one embodiment, the sender filtering process 250 is performed by the processor 400 of the detection circuit 134. In another embodiment, the sender filtering process 250 is performed in an isolated or quarantined core of the processor 120 and/or memory 122.

In one embodiment, a sender filtering process can be used to prevent local DoS attacks on wireless networks such as Wi-Fi and proprietary radio formats such as Zigbee, Z-wave, 802.15.4 radios, etc. In this embodiment, the concern is that a compromised device's application software 150 will cause the communications module 130 to constantly broadcast on the transceiver 132 and effectively cripple communication between legitimate (non-infected) devices by overwhelming wireless receivers, or transceivers 132 of one or more other IoT device 102a-n, with extraneous data.

In one embodiment, the sender filtering process 250 includes sending, by the communications module 130 of the target device, a data packet having a PAUSE command after a session connection has been made to affect the transmission of data packets from a sending device based at least in part on an IP address and optionally the port used of the sending device, and, the sending device includes a combination of hardware, logic, and software that functions between its application software 150 and the Internet to enforce the PAUSE command regardless of any commands or compromise to the application software 150. The PAUSE command may include one or more commands to Throttle, Pause, or Turn Off the transmission of data packets of the sending device.

In one embodiment, the sender filtering process 250 further includes storing, by the processor 120 or the processor 400, the IP address and port used, when available, of the sending device into the memory 122 or the memory 404 respectively. The sender filtering process 250 may further cause the processor 120 and/or the processor 400 to block or limit communications between the sending device and the target device.

In one embodiment, the sender filtering process 250 further includes storing, by the processor 120 and/or the processor 400, the IP address and port used, when available, of the sending device into the memory 122 and/or the memory 404 respectively. The sender filtering process 250 may further cause the processor 120 and/or the processor 400 to block or limit communications between the sending device and the target device by sending a control signal to the communications module 130. In one embodiment, the sender filtering process 250 may further block or limit communications between the sending device and the target device for a predetermined period of time. Once the predetermined period of time has elapsed, the sending device and the target device may resume communications.

In one embodiment, the sender filtering process 250 may be performed by the controller 112. The controller 112 may store the IP address and the port (when used) of both the sending device and the target device.

In one embodiment, the sender filtering process 250 may by modified such that step 254 includes, receiving, by the sending device, a packet having a PAUSE command from the receiving device, where the PAUSE command may include a command to Throttle, Pause, or Turn Off the transmission of data. The sending device may include a combination of hardware, logic, and software that functions between its application software 150 and communications module 130 and/or transceiver 132 to enforce the PAUSE command regardless of any command from or compromise to the application software 150 or the operating system 152.

In one embodiment, step 258 may be modified to store one or more transmission information such as, but not limited to, a frequency, channel, and/or a receiving device identifier into a memory. In one embodiment, the sender filtering process 250 may be performed by the controller 112. The controller 112 may store transmission information of both the sending device and the target device. After a determination that the sending device may be compromised, the sending device and/or the controller 112 may block additional attempted connections and transmissions from the sending device until the sending device and/or controller 112 receives a command from the target device to re-enable the communications module 130, power module 124, and/or the transceiver 132.

In one embodiment, if a quantity of transmission information reaches a storage threshold, the processor 120 of the sending device may terminate any transmission. Terminating a transmission may include, for example, sending a control signal thereby disabling the transceiver 132, disabling the power module 124, disabling the communications module 130

In one embodiment, the controller 112 is a hub of the ecosystem provider. In another embodiment, the controller 112 is a device under control of an Internet Service Provider and/or telecommunications company. In such an embodiment, the Internet Service Provider and/or telecommunications company may implement the sender filtering process 250 on the controller 112 as described in more detail above, thus the controller 112 may block transmissions from a particular sending device, for example, after the sender filtering process 250 determines that the particular sending device has been compromised. The controller 112 may cache blocking commands for a specific period of time, that is, the controller 112 may store transmission information and/or PAUSE command information for a specific period of time. In one embodiment, the controller 112 may block transmission from the particular sending device if the controller 112 has determined that that sending device, having received the PAUSE command, fails to properly respond to the PAUSE command as described above.

Figure 6:
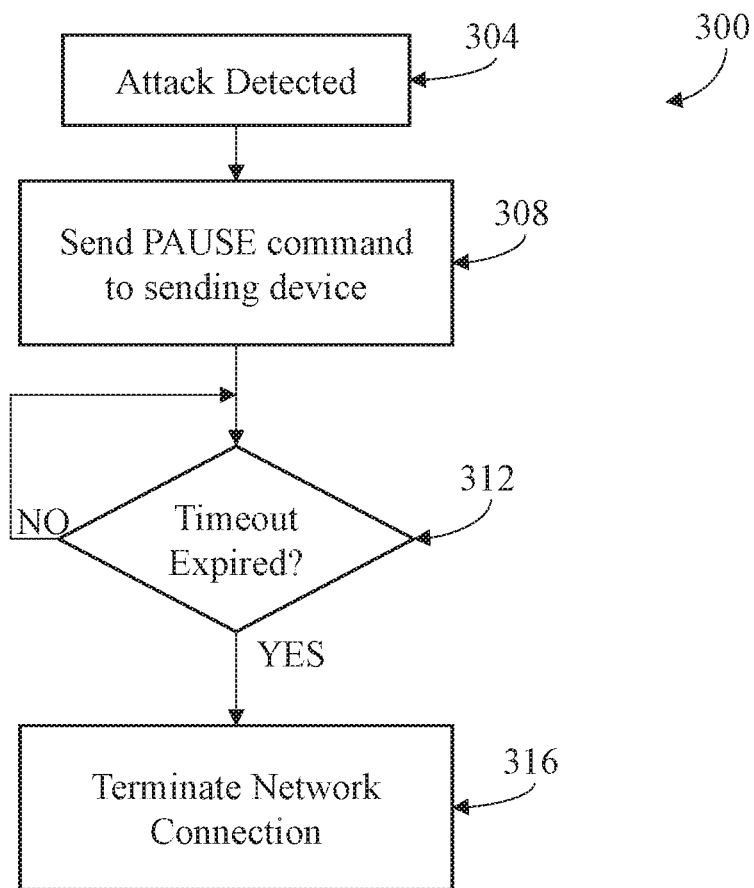
FIG. 6 is a diagram of an exemplary embodiment of a receiver filtering process.

Referring now to FIG. 6, shown therein is a diagram of an exemplary embodiment of the receiver filtering process 300 generally comprising the steps of: detecting an attack (step 304); sending a PAUSE command to a sending device (step 308); waiting for a timeout period for the PAUSE command (step 312); and terminating the network connection between the sending device and the receiving device. In one embodiment, after completion of the sender filtering process 250, the operation process 196 may continue at step 212, disabling the transmitter.

In one embodiment, detecting the attack (step 304) includes storing one or more transmission information such as sending device identification, timestamp of the transmission, or other data packet information in the memory 120 and/or the memory 404. In one embodiment, the processor 120 and/or the processor 400 of the receiving device creates one or more sending device model based on the transmission information and detects the attack by determining whether transmission information is inconsistent with the one or more sending device model.

In one embodiment, the receiving device, after detecting the attack (step 304) may be considered the target device. In one embodiment, sending the PAUSE command to the sending device (step 308) may include sending, by the communications module 130, a Throttle, a Pause, and/or a Turn Off command. In some embodiments, the receiver filtering process 300 does not wait for the timeout period for the PAUSE command (step 312). In such embodiments, after the PAUSE command is sent to the sending device (step 308) the receiver filtering process 300 continues to terminate the network connection between the sending device and the receiving device (step 316).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An Internet of Things device comprising:
 a communications module having circuitry operable to communicatively connect to a computer network, wherein the communications module is controlled at a Medium Access Control (MAC) operational layer;
 a memory operable to store data, including instructions;
 a processor coupled to the memory and the communications module and operable to execute the instructions stored in the memory; and
 an activity module, including at least one of a sensor and a control device, the activity module operating under control of the processor, to perform a designated activity with at least one of the sensor and the control device, the activity module further operable to communicate on the computer network via the communications module;
 a communications pathway to transmit data between the activity module and the communications module;
 a detection circuit indirectly determining the activity level of the communications module,
 wherein the processor is further operable to curtail a volume of communication of the communications module on the computer network if a measured value of an indirect system parameter determined by the detection circuit exceeds a threshold value and wherein the indirect determination is not part of the communication pathway nor is it involved in any control of the communications pathway.

2. The Internet of Things device of claim 1 wherein the computer network is a wide-area network (WAN).

3. The Internet of Things device of claim 1 further comprising a power module having circuitry to supply power to the communications module, and wherein the detection circuit comprises a power sensor that monitors the level of power supplied by the power module and the processor is operable to curtail the volume of communication of the communications module on the computer network if the power supplied by the power module to the communications module exceeds a threshold power value.

4. The Internet of Things device of claim 3 wherein the processor is operable to curtail the volume of communication of the communications module on the computer network if the power supplied by the power module exceeds the threshold power value for a predetermined period of time.

5. The Internet of Things device of claim 1 wherein the communications module is operably connected to a control bus such that one or more control signals sent on the control bus may cause the communications module to activate and wherein the detection circuit comprises a bus monitor that monitors for control signals on the control bus and the processor is operable to curtail the volume of communication of the communications module on the computer network if the measured number of control signals exceeds a threshold control signals value.

6. The Internet of Things device of claim 1 wherein the communications module is controlled at a physical (PHY) operational layer and wherein the detection circuit measures activity on the PHY layer and the processor is operable to curtail the volume of communication of the communications module on the computer network if the activity on the PHY layer associated with the communications module exceeds an active transmission value.

7. The Internet of Things device of claim 1, wherein the detection circuit is operable to measure a value of the indirect system parameter during a period of time when the activity module is inactive to thereby establish an inactive parameter threshold value, wherein the processor is further operable to curtail the volume of communication of the communications module on the computer network if the indirect system parameter exceeds the inactive parameter threshold value when the activity module is inactive.

8. The Internet of Things device of claim 1, wherein the detection circuit is operable to measure a value of the indirect system parameter during a period of time when the activity module is active to thereby establish an active parameter threshold value, and wherein the processor is further operable to curtail the volume of communication of the communication module on the computer network if the indirect system parameter exceeds the active parameter threshold value when the activity module is active.

9. The Internet of Things device of claim 8, wherein the detection circuit is operable to monitor multiple levels of activity of the activity module, and to establish a first active parameter threshold value when the activity module is at a first activity level, and a second active parameter threshold value when the activity module is at a second activity level, and wherein the processor is operable to curtail the volume of communication of the communication module on the computer network if the indirect system parameter exceeds the first active parameter threshold value when the activity module is at the first activity level, or the indirect system parameter exceeds the second active parameter threshold value when the activity module is at the second activity level.

10. The Internet of Things device of claim 9, wherein the first activity level has a first operational parameter and the second activity level has a second operational parameter greater than the first operational parameter.

11. The Internet of Things device of claim 10, wherein the first activity level is a trickle activity level.

12. The Internet of Things device of claim 10, wherein the first activity level is a normal activity level.

13. The Internet of Things device of claim 10, wherein the second activity level is a hyper activity level.

14. The Internet of Things device of claim 3, wherein the indirect system parameter is power supplied by the power module and the detection circuit is operable to measure a value of the level of power supplied by the power module during a period of time when the activity module is inactive to thereby establish an inactive power parameter threshold value, wherein the processor is further operable to curtail the volume of communication of the communications module on the computer network if the indirect system parameter exceeds the inactive power parameter threshold value when the activity module is inactive.

15. The Internet of Things device of claim 14 wherein the detection circuit is operable to measure the value of the power supplied by the power module during a plurality of periods of time when the activity module is inactive to thereby establish the inactive power parameter threshold value when the activity module is inactive.

16. The Internet of Things device of claim 3, wherein the indirect system parameter is power supplied by the power module and the detection circuit is operable to measure a value of the power supplied by the power module during a period of time when the activity module is active to thereby establish an active power parameter threshold value, wherein the processor is further operable to curtail the volume of communication of the communications module on the computer network if the indirect system parameter exceeds the active power parameter threshold value when the activity module is active.

17. The Internet of Things device of claim 16 wherein the detection circuit is operable to measure the value of the power supplied by the power module during a plurality of periods of time when the activity module is active to thereby establish the active power parameter threshold value when the activity module is active.

18. The Internet of Things device of claim 1 wherein the threshold value of the indirect system parameter has an initial value, the initial value being programmed into the memory.

19. The Internet of Things device of claim 1 wherein the threshold value of the indirect system parameter has an initial value, the initial value being programmed into the memory using threshold data provided by another Internet of Things device communicatively connected to the computer network.

20. The Internet of Things device of claim 1 wherein the communication module includes a transceiver.

21. The Internet of Things device of claim 1 wherein the detection circuit is integrated with the processor.

* * * * *